United States Patent
Beaurepaire

(10) Patent No.: US 10,724,874 B2
(45) Date of Patent: Jul. 28, 2020

(54) VIRTUAL REALITY ENVIRONMENT RESPONSIVE TO PREDICTIVE ROUTE NAVIGATION

(71) Applicant: HERE Global B.V., Veldhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 395 days.

(21) Appl. No.: 14/881,834

(22) Filed: Oct. 13, 2015

(65) Prior Publication Data

US 2017/0103571 A1 Apr. 13, 2017

(51) Int. Cl.
  G01C 21/36 (2006.01)
  G09B 9/02 (2006.01)
  G06F 3/01 (2006.01)

(52) U.S. Cl.
  CPC .......... *G01C 21/3667* (2013.01); *G06F 3/011* (2013.01); *G09B 9/02* (2013.01); *G01C 21/3638* (2013.01)

(58) Field of Classification Search
  CPC .......... G01C 21/365; G02B 2027/0141; G06T 19/006; G06T 11/60; B60R 1/00; B60R 2300/308; B60R 2300/20; B60R 2300/205; B60R 2300/305; B60R 2300/8006; G06F 3/011; G06F 3/013; G06F 3/017; H04N 7/18
  See application file for complete search history.

(56) References Cited

U.S. PATENT DOCUMENTS

| | | | | |
|---|---|---|---|---|
| 5,662,523 | A * | 9/1997 | Yasumaru | A63F 13/12 463/30 |
| 8,731,279 | B2 * | 5/2014 | Shin | H04N 13/0011 348/42 |
| 8,947,253 | B2 | 2/2015 | Bloom et al. | |
| 2008/0292211 | A1 * | 11/2008 | Frantz | G01N 21/8806 382/284 |
| 2011/0298640 | A1 * | 12/2011 | Tate, Jr. | B60L 3/12 340/995.1 |
| 2014/0063064 | A1 * | 3/2014 | Seo | G08G 1/0962 345/633 |
| 2014/0240349 | A1 | 8/2014 | Tuukkanen | |
| 2015/0062168 | A1 * | 3/2015 | Ng-Thow-Hing | G02B 27/01 345/633 |
| 2015/0097861 | A1 | 4/2015 | Alaniz et al. | |
| 2016/0240012 | A1 * | 8/2016 | Gruenler | B60R 1/00 |

OTHER PUBLICATIONS

CES 2015: Dynamic eHorizon from Continental Points to the Furture, Dec. 10, 2014, Continental Corporation.

(Continued)

*Primary Examiner* — Ming Wu
(74) *Attorney, Agent, or Firm* — Lempia Summerfield Katz LLC

(57) ABSTRACT

A vehicle state sensor data record associated with a current state of a vehicle is received. A predictive vehicle navigation data record based on map data is also received. The map data is associated with a current location of the vehicle. A first element of a virtual reality environment is adapted based on the received vehicle state sensor data record, and second element of the virtual reality environment is generated based on the received predictive vehicle navigation data record.

20 Claims, 14 Drawing Sheets

(56) References Cited

OTHER PUBLICATIONS

Kadavasal et al., Sensor Enhanced Virtual Reality Teleoperation in Dynamic Environment, Mar. 10-14, 2007, Iowa State University.
Larson, Augmented Reality Google Goggles . . . Real World Games Please!, Feb. 8, 2012, joelarson.com.
The Furture of Smartphones: A Combination of Sensors, Machine Learning and Virtual Reality, Feb. 24, 2015, venturebeat.com.
We're Bringing Airtime to Mobile VR, 2014-2015, vr-coaster.com.
William, Take a Oculus Rift Virtual Reality Test Drive into Space in a Mitsubishi Outlander Phev, Dec. 16, 2014, japantrends.com.

* cited by examiner

VIRTUAL REALITY ENVIRONMENT RESPONSIVE TO PREDICTIVE ROUTE NAVIGATION

FIELD

The following disclosure relates to generating virtual reality environments, and more particularly, to the creation of an in-vehicle virtual reality environment responsive to predictive route navigation, surroundings of the vehicle, and state of the vehicle.

BACKGROUND

A need exists to make travelling by vehicle more engaging for passengers. As semi-automated and autonomous vehicles are developed, passengers—including the driver—now have more opportunities for leisure, entertainment, and experiences while in transit. Frequently repeated trips such as commutes and longer trips provide an opportunity for passengers to be entertained.

Virtual reality entertainment provides an array of games and entertainment. Conventional virtual reality entertainment is based on creating an experience or game that may incorporate the user's input to a controller, such as a first person gaming environment. Other conventional virtual reality entertainment includes application of virtual reality components while the user is in motion, such as using virtual reality in tandem with an amusement park ride. Amusement park virtual reality experiences enhance a user's experience while the user is moved through a known path with known timing. Still other conventional virtual reality entertainment is focused on augmented reality, applying a virtual reality visual layer to the user's field of view. Some conventional virtual reality games allow a user wear a virtual reality device to create a gaming environment for users walking through real environments, overlaying virtual reality elements in the real world view and overlaying virtual reality elements over other users to create a gaming environment. Such conventional games exploit real time kinematics (RTK) in conjunction with global positioning system (GPS) information to track the user's current location. Still other virtual reality games provide a cockpit or other simulated environment for a user to interact with such as flight simulators, that simulate physical sensations such as turbulence and changing orientation and position of the aircraft while the user navigates through the simulation using replica controls of the aircraft.

SUMMARY

In one embodiment, a method for creating virtual reality elements using predictive vehicle navigation provides receiving a vehicle state sensor data record associated with a current state of a vehicle and receiving a predictive vehicle navigation data record based on map data, the map data associated with a current location of the vehicle. The method also provides adapting a first element of a virtual reality environment based on the received vehicle state sensor data record, and generating a second element of the virtual reality environment based on the received predictive vehicle navigation data record.

In one embodiment, a system for creating virtual reality elements using predictive vehicle navigation is provided. The system includes at least one processor and at least one memory including computer program code for one or more programs. The at least one memory and the computer program code configured to, with the at least one processor, cause the system to at least receive a vehicle state sensor data record associated with a current state of a vehicle receive a predictive vehicle navigation data record based on map data. The map data is associated with a current location of the vehicle. The system is may also receive a vehicle environment sensor data record associated with current surroundings of the vehicle, adapt a first element of a virtual reality environment based on the received vehicle state sensor data records, and generate a second element of the virtual reality environment based on the received predictive vehicle navigation data record, and generate a third element of the virtual reality environment based on the received vehicle environment sensor data record associated with the current surroundings of the vehicle.

In one embodiment, a system for creating virtual reality elements using predictive vehicle navigation is provided. The system includes at least one vehicle sensor, at least one map database, at least one processor, and at least one memory including computer program code for one or more programs. The at least one memory and the computer program code configured to, with the at least one processor, cause the system to at least receive a vehicle state sensor data record associated with a current state of a vehicle receive a predictive vehicle navigation data record based on map data. The map data is associated with a current location of the vehicle. The system may also receive a vehicle environment sensor data record associated with current surroundings of the vehicle, adapt a first element of a virtual reality environment based on the received vehicle state sensor data records, and generate a second element of the virtual reality environment based on the received predictive vehicle navigation data record, and generate a third element of the virtual reality environment based on the received vehicle environment sensor data record associated with the current surroundings of the vehicle. The system further configured to display the virtual reality environment via the virtual reality output device.

In yet another embodiment, a non-transitory computer readable medium for creating virtual reality elements is provided including instructions that when executed are operable to receive a vehicle state sensor data record associated with a current state of a vehicle. Instructions may also be included to receive a predictive vehicle navigation data record based on map data, the map data associated with a current location of the vehicle, receive a vehicle environment sensor data record associated with current surroundings of the vehicle, and receive an externally generated vehicle sensor data record from at least one other vehicle. The non-transitory computer readable medium may also include instructions that when executed are operable to adapt a first element of a virtual reality environment based on the received vehicle state sensor data records, generate a second element of the virtual reality environment based on the received predictive vehicle navigation data record, and generate a third element of the virtual reality environment based on the received vehicle environment sensor data record associated with the current surroundings of the vehicle. The non-transitory computer readable medium may further include instructions that when executed are operable to adapt a fourth element of the virtual reality environment based on the received externally generated vehicle sensor data record.

BRIEF DESCRIPTION OF THE DRAWINGS

Exemplary embodiments of the disclosure are described herein with reference to the following drawings.

DETAILED DESCRIPTION

Figure 1:
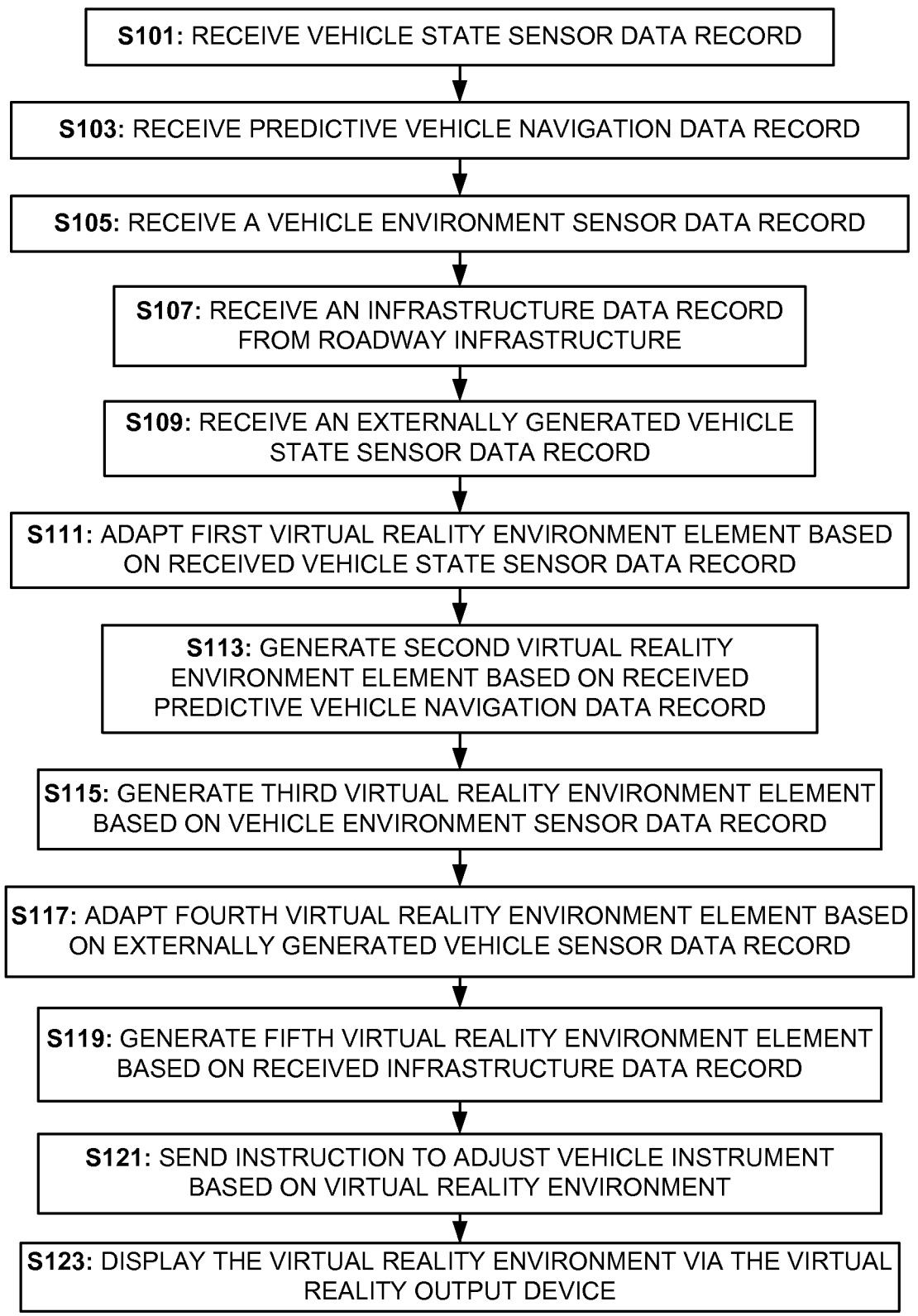
FIG. 1 is a flow diagram in accordance with the subject technology for creating virtual reality elements using predictive vehicle navigation.

Passengers in a vehicle experience many sensations while in-transit. The movement of the vehicle such as direction, speed, acceleration, sound and sensory information impacts the passenger's experience. The route of the vehicle further contributes to the experience as the passenger will experience sensory changes through turns, straightaways, stops, traffic, speed limit changes and other changes. The view of each passenger further changes as the vehicle moves through space. Other vehicles, traffic lights, geographic and man-made features of the motorist's environment further affect the travel experience. Navigation systems provide route details and contextual information. Predictive navigation systems provide anticipatory map data and contextual information, alternate route information sensitive to traffic, and provides the vehicle with the ability to maximize mechanical efficiency of the vehicle based data associated with the road ahead.

In-vehicle virtual reality provides an opportunity to change the visual experience of a trip, while retaining the sensory experience associated with the ride. Virtual reality content that is complimentary, anticipatory, reactive, and responsive to sensory information associated with the ride provides a more realistic virtual reality experience. That is, physical sensations associated with the ride may be integrated into the virtual reality experience through the use of sensor inputs from the vehicle. Anticipatory data can further be used to create richer virtual reality content and enables the virtual reality experience to be responsive to events and conditions beyond what the passenger can anticipate through his current field of view.

The term "vehicle" as used herein encompasses its plain and ordinary meaning including, but not limited to a car, bus, train, plane, boat, bicycle, tramway, pedestrian locomotion. The term "vehicle" includes any motorized or unmotorized form of transportation and/or locomotion. The virtual reality system may be used in tandem with an autonomous or semi-autonomous vehicle. One or multiple passengers in the vehicle may use the virtual reality system. The driver may be included as one of the passengers using the virtual reality system. "Passenger" may refer to any one or more passengers of the vehicle including the driver. Driver use of the virtual reality system may be particularly applicable to applications associated with semi-autonomous or autonomous vehicles. The passengers may each have a separate virtual reality device. The passengers may all share the same virtual reality experience/environment, or one or more passengers may have similar experiences. One or more passengers may have a different experience/environment. Passengers sharing similar or the same experiences may see and/or communicate with other passengers within the virtual reality environment. In some game environments, passengers may work together, or play against one another. Passengers and/or other vehicles using the virtual reality system, may also see and/or communicate with passengers in another vehicle via the network or via communication between virtual reality devices and/or vehicles. Shared experiences/environments may reduce processing demands by receiving and computing data at a common location and provided to participating client devices.

A goal of the disclosure is to provide a virtual reality device combined with vehicle sensor data and predictive navigation data that corresponds to and is reflective of a dynamic environment of the vehicle. Vehicle travel may be made more engaging for passengers. The dynamic environment may include recognition of a recurring route, such as commuting home or to work and further includes routes with destinations that are unknown to the virtual reality system. A further goal of the disclosure is to generate a virtual reality environment using elements corresponding to sensations that the passenger will feel in the vehicle. A goal of the disclosure is to provide a smooth transition between the virtual environment and the physical world. Indications and/or messages may be provided to the passenger indicating that the virtual reality environment will end. The subject disclosure departs from conventional solutions in that the virtual reality environment is based on an unknown route. The subject disclosure presents an environment that is reflective of the vehicle's surroundings in a dynamic way. Unlike other virtual reality technology, the virtual reality system is not complete before commencing a trip. Thus, the virtual reality experience is not based on a static, repeating scenario. In contrast, the virtual reality environment of the subject disclosure adapts to the actual driving experience.

Elements of a virtual reality environment include, but are not limited to brightness, color, contrast, content, sound effects, dialog, music, white noise, foreground visual elements, background visual elements, speed of virtual motion, and perspective view elements. Elements of the virtual reality environment may further include components of stories, games, characters, and locations. Elements of the virtual reality may further include scenarios including one or more other elements of a virtual reality environment.

FIG. 1 is a flow chart of a method of the subject technology for creating virtual reality elements using predictive vehicle navigation that may be performed by server 125 to generate and/or enhance a virtual reality environment. Some or all of the acts may be performed by processor 300 of server 125. Alternately, some or all of the acts may be performed by a processor 200 of a client device such as mobile device 122, vehicle 129, or virtual reality device 133. Different acts of the method may be performed by multiple processors. Portions of the method may be performed by processors 200 of client devices 122, 129, and/or 133. Portions of the method may be performed by processors 200 of client devices 122, 129, and/or 133 only when server 125 is unavailable via network 127 (e.g., when the vehicle is in a remote area, underground, in a tunnel, in an enclosed structure such as a parking garage). Processors 200 of client devices 122, 129, and/or 133 may alternatively perform portions of the method based on processing requirements, if a route is known before commencing the route, if a trip is known, if a trip is known to be of a short duration, if a connection to network 127 is lost, or the like. Acts of FIG. 1 are described with reference to the system and components depicted in FIGS. 5-9. Additional, different, or fewer acts may be performed. Acts may be performed in orders other than those presented herein or may be performed simultaneously or substantially simultaneously. The term "substantially simultaneously" as used herein refers to timing of events temporally so close together as to be considered or perceived as being simultaneously occurring, for example, the time of receipt or transmission of data that is too close to measure or otherwise discriminate among.

In act S101, server 125 receives a vehicle state sensor data record associated with a current state of a vehicle. Vehicle state sensor data records may include or comprise speed, acceleration or deceleration, engine pressure, engine temperature, gear shifting, tire pressure, wheel speed and vibration, windshield wiper setting, turn signal setting, gear selection, headlight and interior light settings, window sensors, in-vehicle climate settings, obstacle detection, Adaptive Cruise Control (ACC), autopilot steering control, safety features, autonomous driving systems and/or navigation system of the vehicle. Vehicle state sensor data records may additionally include any other sensors 126 associated with mechanical and electrical components of vehicle 129. For example, when the driver (or an autonomous vehicle) brakes, the vehicle 129 will decelerate and the vehicle 129 will be in a state of deceleration.

In act S103, server 125 receives a predictive vehicle navigation data record based on map data, the map data associated with a current location of the vehicle. Predictive vehicle navigation data records may provide data associated with road conditions and elements that are within a range of several kilometers/miles around the current location of vehicle 129. Predictive vehicle navigation data may include data obtained via sensors 126 of vehicle 129 in addition to data from sources physically separate from vehicle 129. Map data, including, but not limited to, high definition (HD) map data may be stored in databases 123a-n associated with electronic horizon generator 131. HD map data may include imagery obtained using Light Detection And Ranging technology (LiDAR). Predictive vehicle navigation data may further include data originating from other vehicles 129, data originating or stored on networking devices 135, and/or data originating from traffic devices 137. Predictive vehicle navigation data may be associated with traffic, accidents, and/or geographic areas that are at a distance beyond what can be seen by passengers in vehicle 129.

In one example, audio is captured by vehicles ahead of vehicle 129. Construction noises, traffic, emergency vehicle sirens, or other audio. In some examples a decibel level may be identified to determine how loud or quiet the upcoming road is compared to the current location of the vehicle.

In act S105, server 125 receives a vehicle environment sensor data record associated with current surroundings of the vehicle. Vehicle environment sensor data may be obtained by short range sensors 126 integrated or coupled with vehicle 129, providing data associated a range up to several hundred meters/feet. Short range sensors 126 may include radar data. The vehicle environment may be identified as whether the vehicle is on a slope. The slope detection may be comprised of combinations of sensor data, such as acceleration and braking indicating that the vehicle is on a downward slope. The vehicle 129 sensors may identify nearby vehicles and detect the current speed of those vehicles. The vehicle environment may further identify changing light conditions, such as night fall, or the vehicle's entry into a tunnel or parking garage.

In act S107, the server 125 receives an infrastructure data record from roadway infrastructure. Roadway infrastructure communication may include data between vehicles and roadway infrastructure. Roadway infrastructure communication may also include communication with traffic devices 137 including traffic signal phase data and timing information. Based on the traffic signal phase information, it may be determined whether the vehicle 129 will have to stop or not at a traffic light. Roadway infrastructure data may further identify whether bridges are open or closed, tolling stations, parking lot information (including open space information), accident data, weather or road conditions, and the like. Receipt of roadway infrastructure data may provide accident or traffic data before such information is available through the vehicle's sensors.

The server 125 receives an externally generated vehicle state sensor data record from at least one other vehicle in act S109. Other vehicles proximate to the current location of vehicle 129 may additionally provide information that may be used in the virtual reality environment. Current vehicle state information gathered by other vehicles 129 may be provided to vehicle 129 such as braking and acceleration information, turn signals, or other vehicle instrument sensors. Passengers in nearby vehicles also using the virtual reality environment may share an experience or may be interactive within a threshold distance. External vehicle information such as turn single indications may be used to anticipate whether another vehicle is entering the lane. Emergency information, such as a nearby vehicle sliding or hydroplaning on the road may be detected or provided. Precomputed information associated with electronic horizon generator 131 may be passed to vehicle 129 from other vehicles.

In act S111, server 125 adapts a first element of a virtual reality environment based on the received vehicle state sensor data record. The first element of the virtual reality environment is adapted to provide a complementary experience to the current state of the vehicle. Multiple received vehicle state sensor data records may be interpreted in combination to deduce the current vehicle state.

For example, deceleration of the vehicle may constitute the received vehicle state sensor data record and the corresponding rate at which the virtual reality environment changes may be reduced in proportion with the degree of deceleration. The deceleration of the vehicle may be detected by an accelerometer or via sensors associated with the braking system of vehicle 129. The adaptation of the virtual reality element of rate may correspond such that the background of the virtual reality environment progresses at what appears to be the same rate as images would appear through the windshield of vehicle 129. In an example of a virtual city tour, virtual travel through the city scene may appear to decelerate at the same rate as vehicle 129. Additional virtual reality elements, such as the level of detail or sharpness of focus the virtual reality environment may be increased corresponding to deceleration. In the virtual city tour example, informational text may appear identifying landmarks, providing trivia, history, and the like. More, or more detailed informational text may appear as a result of the received vehicle state of deceleration of vehicle 129.

If the vehicle state sensor data record indicates that the vehicle is in low speed traffic or has stopped moving, the virtual reality elements may be adapted accordingly. In an example of a historical or tourism theme, additional textual or audio information may be provided based on the nearby landmarks. The environment theme may change to a quieter environment, such as a placid lake or pastoral scene. The amount of visual information or the resolution of the virtual environment may be adjusted. The first person perspective may change to a third person view or birds eye view while the vehicle 129 is idling.

If the vehicle state sensor data record may indicate whether ACC has been engaged. Once engaged, the vehicle state sensor data record may further include sensor data associated with the current and/or future speed of the vehicle 129 based on maintaining a threshold distance from other vehicles. Virtual reality elements may then be based on the ACC data records to provide an advanced indication of changes in the speed of vehicle 129. For example, the generated virtual reality elements provide changes in the speed of play in the virtual world to correspond with anticipated speeds of the vehicle received via ACC data records. The resolution of the virtual environment elements may increase based on anticipated reductions in speed, or new scenarios, change in theme, or addition of plot points adapting the speed of play in the virtual world may be provided. Gear shifting sensor data may be combined with steering sensor data to determine whether the vehicle is, or is about to change gear, reverse direction, or make a u-turn. The vehicle information may be used to determine virtual reality elements such as field of view. Other virtual reality elements, providing virtual reality elements corresponding to the sensation of moving backwards (e.g., a gust of wind) and/or centripetal force (e.g., a merry-go-round), may be provided upon indication of different vehicle maneuvers.

Data associated with windows opening, or climate control changes, such as turning on the air-conditioner initiated by passengers within vehicle 129, may be used to generate virtual reality elements, such as a window breaking in a space shuttle environment, a snow storm, gusts of wind or other generated events and objects.

In act S113, server 125 generates a second element of the virtual reality environment based on the received predictive vehicle navigation data record. A predicted route associated with the predictive vehicle navigation data records may correspond to a path in the virtual reality environment. Predictive vehicle navigation data records may be created or processed by electronic horizon generator 131 and provided to virtual reality generator 121.

Electronic horizon information may include topographical information such as skyline or building outline information associated with HD maps. Such information obtained and processed by the virtual reality generator 121 such that the virtual reality content is generated having a similar profile, outline, or appearance of the physical objects and background encountered by the vehicle 129. Obtaining such predictive vehicle navigation data provides a dynamic virtual environment based on the actual course of the vehicle, even when driver's intended route and/or destination is unknown by the virtual reality generator 121 and/or electronic horizon generator 131.

Electronic horizon information may include number of lanes, slope, type of road (such as dirt, gravel, paved, or brick), type of surface, curvature, possible intersections, possible traffic ahead, traffic lights. Electronic horizon information may be able to predict speed changes (acceleration or deceleration), lane changes, route, or other elements that may be implemented with corresponding elements in the virtual reality environment. Predictive navigation data may include anticipation of traffic conditions ahead such as traffic jams, a transition from interstate driving to city driving, construction, accidents and other traffic conditions that will affect the length of the trip.

The receipt of road environment information at further distances may improve the available resolution, level of detail in the virtual reality environment. Data processing may begin in advance of the arrival of the vehicle to the location corresponding to virtual reality environment components, preventing gaps in the virtual reality experience without advance knowledge of the route.

Predictive vehicle navigation data may include audio information, audio elements of the virtual reality environment may be generated, augmented, or enhanced. The virtual reality audio level may be augmented by increasing or decreasing a volume of the virtual reality audio level when the current location of the vehicle 129 reaches the location at which the audio information was collected by the vehicles ahead of vehicle 129. Visual virtual reality content may additionally be alternatively or additionally generated based on the predictive audio. If it is known that loud construction noises will likely be encountered by vehicle 129, the computed virtual world may include background visuals such as explosions or heavy machinery calculated to appear as the vehicle physically encounters the construction area. Virtual reality events may be also be generated to complement the sound. Virtual reality elements may be generated to have an inversely proportional relationship to the predictive audio information. That is, white noise levels may be increased through the virtual reality device 133 to reduce the effect of loud noises outside the vehicle, or the sound effects and/or music playing in the virtual reality environment may be increased or decreased so that the audio level of the virtual reality environment appears to remain constant or remains audible regardless of the sounds outside of vehicle 129. The virtual reality environment may mitigate extreme changes in sound level encountered by the passengers. That is, the virtual reality volume may be augmented to gradually increase and decrease (or decrease and increase) as the vehicle approaches and exits the physical environment with loud noise. Audio portions of the virtual reality environment may be played through the virtual reality device 133, mobile device 122, and/or vehicle 129.

The electronic horizon generator 131 may receive information from vehicle 129 regarding the location and speeds of other vehicles that are nearby. The electronic horizon generator 131 may predictively determine whether vehicle 129 will overtake or pass any of the nearby vehicles and predict increases in speed and lane changes based on the information. These predictive indications may be translated into side to side movement and increases or decreases in speed within the virtual environment as well. Objects may be created in the virtual reality environment that approximate the location and size of the nearby vehicles in the virtual environment. In a game-type virtual reality environment, the events in the game may be generated to correspond or compliment the current surroundings of the vehicle 129. Predictive navigation data indicating that the speed of the vehicle will be reduced through traffic congestion ahead, the generated virtual reality elements may include a new scenario such as an attack of monsters in a gaming environment, change in theme, or addition of plot points to justify the speed of play in the virtual world.

In act S115, the server 125 generates a third element of the virtual reality environment based on the received vehicle environment sensor data record associated with the current surroundings of the vehicle. Upon detection of environment sensor data record of the current speed of vehicles nearby, elements in similar spatial relation to those external vehicles 129 may be created and displayed in the virtual environment. The detection of objects, such as other vehicles, and the state of those objects may dictate the movement or spatial relation of objects in the virtual reality environment. For example, other vehicles may be represented as animals, landscape objects, game characters, or other objects that may move in correspondence with the current surroundings of vehicle 129. Changing light conditions of the environment of vehicle 129 may have a darkening or lightening effect in the virtual reality environment, or may result in changing the virtual reality environment, such as entry into a cave corresponding with entry into a tunnel by vehicle 129. The generated virtual reality environment may include changing the opacity of a portion or all of the display of the virtual reality device, such that elements in the physical environment are unobstructed from the passenger's view. For example, if police vehicle is identified (e.g., via image recognition associated with the vehicle's camera or other sensor) and the gaming environment includes a bank robbery scene, portions of the virtual reality display device 133 may become see-through, such that the view of the physical police vehicle is incorporated into the virtual reality environment. Opacity of the virtual reality device 133 may be controlled as a mask layer, segmenting the desired visual element from the entire field of view, while the identified object (e.g., the police vehicle) is detected by the sensors 126 of vehicle 129 and within the field of view.

The server 125 adapts a fourth element of the virtual reality environment based on the received externally generated vehicle sensor data record in step S117. The vehicle 129 may receive externally generated data transmitted from other vehicles 129 nearby. The state of external vehicles may also provide anticipatory information, such as data indicating that a vehicle ahead has turned on its left turn signal indicating that the vehicle ahead will turn left. This anticipatory data may be used to pre-process virtual reality elements, such as the movement, appearance, and size of a corresponding virtual reality element.

The server 125 adapts a fifth element of the virtual reality environment based on the received infrastructure data record in act S119. Roadway infrastructure information may provide information such as whether the vehicle 129 will be stopped by the traffic signal ahead, relating to the speed of play, or movement of content in the virtual reality environment. Information such as the condition of bridges or parking lot information may relate to the size, shape, and layout of objects within the virtual reality environment. Weather information may relate to filters applied to the virtual reality environment creating brighter or darker environments or may result in weather based objects or background elements in the virtual environment.

In act S121, the server sends an instruction to adjust an instrument of the vehicle based on the virtual reality environment. The virtual reality environment may further influence the physical area around the passenger. There may be haptic sensors in the seat. The seat position, climate, position of sunroof, or other instruments of the vehicle may be altered to enhance the virtual experience. For example, a seat warmer may be activated or deactivated or the position of the seat may be changed based on the virtual reality environment. The virtual reality system may further request passenger input to impact the virtual reality system and/or the car's motion itself. Small changes in vehicle speed or braking of the vehicle may be controlled based on events in the virtual reality environment, if such changes can be safely made based on the vehicle's current position, state, and environment.

The server 125 sends instructions to client devices 122, 129, and/or 133 to display the virtual reality environment via the virtual reality output device in act S123. The virtual reality environment output device may include displays on mobile device 122, virtual reality device 133, and or vehicle 129, or a combination thereof.

Vehicle state data, predictive navigation data, vehicle environment may individually or collectively provide an indication that of the end of the trip. At the end of the trip, elements of the virtual reality environment may provide visual, physical, or aural signal to the passenger. In semi-autonomous or autonomous vehicle applications, elements of the virtual reality environment of the driver may provide advance indication that the driver will need to take control of the vehicle. A countdown may be provided. For example, a countdown of one minute prior to returning control to the driver may be provided. The virtual reality environment may provide another indication that the virtual reality environment is ending. For example, in an autonomous or semi-autonomous car, the video feed of the virtual reality environment may indicate to the passenger that the passenger needs to take control of the vehicle. Elements of the environment may be adjusted, such as the ending of a game, completion of a level, end of tour, pause, opacity of the virtual images may decrease, or other virtual end may be generated. The virtual reality environment may automatically end upon detection of an impact (such as being struck by another car), proximity of an emergency vehicle within a threshold distance. Emergency messages not necessitating the end of the virtual reality environment may be overlaid or provided within the virtual environment. An option may be provided under some circumstances asking the passenger whether she would like to end the virtual environment based on events or sensor data. These transition elements provide the passenger with a smooth transition out of the virtual reality environment and prepare the passenger to exit the simulation and/or to take control of the vehicle.

Additional transition elements may provide the passenger with the ability to interact with other passengers in vehicle 129 or messages/calls received via the passenger's mobile device 122. A passenger in vehicle 129 may interact with vehicle 129 to provide an input indicating that communication is desired. A notification may be provided via the virtual reality device 133. The notification, such as a sound or visual indication may be timed based on events in the virtual reality system, such as at the end of a game battle, end of level, or other suitable time for an interruption within the virtual environment. A notification may also be provided to passengers in the vehicle (via vehicle 129 or virtual reality device 133) once the notification has been provided in the virtual reality environment, or once the an appropriate time for interruption has been determined.

Figure 2:
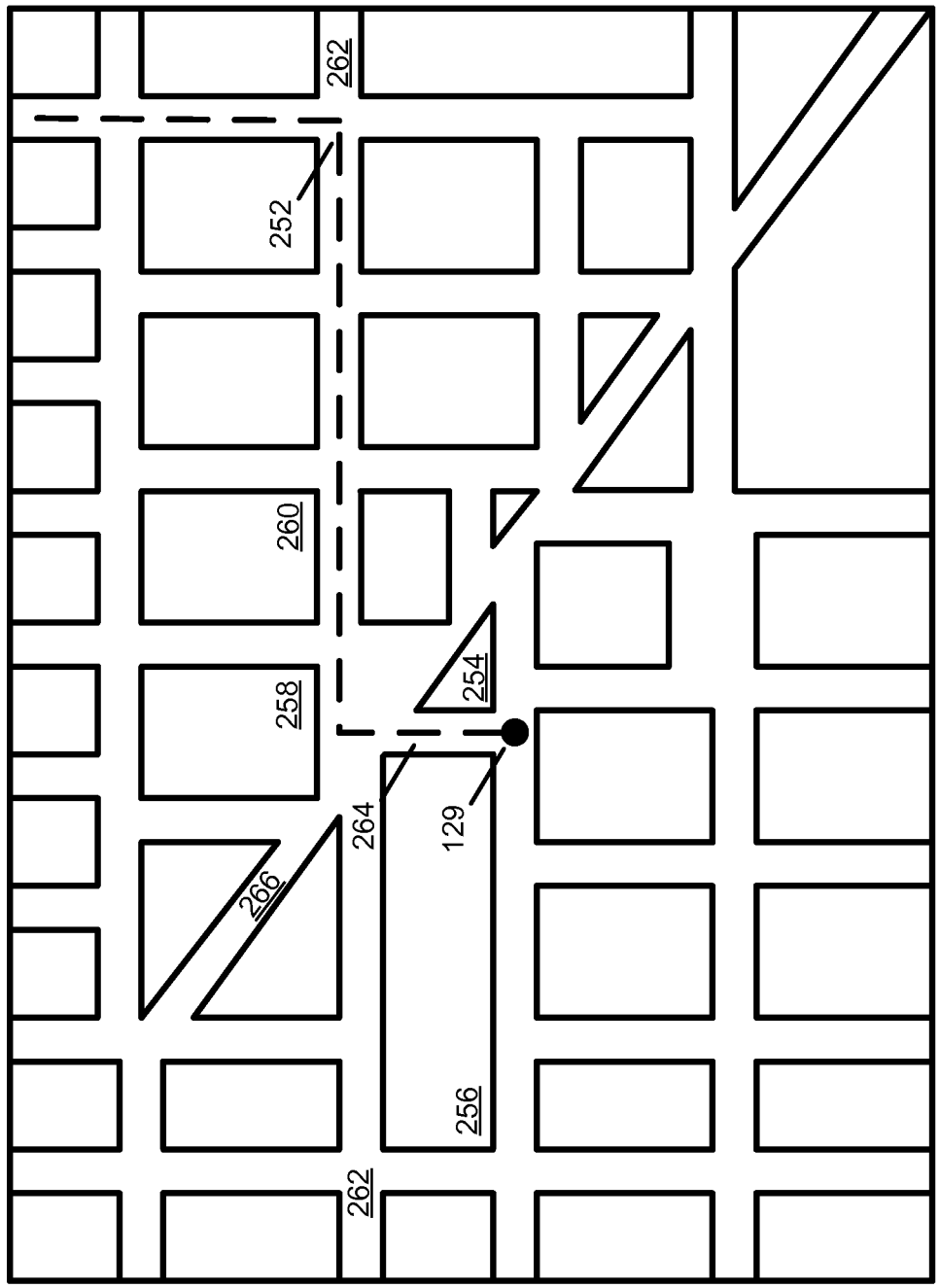
FIG. 2 illustrates the current location of a vehicle and its predicted route from a top down view in accordance with the subject technology for creating virtual reality elements using predictive vehicle navigation.

FIG. 2 illustrates the current location of a vehicle and its predicted route from a top down view in accordance with the subject technology for creating virtual reality elements using predictive vehicle navigation. The current location of vehicle 129 in a simplified birds eye view may be represented by black circle 129. The vehicle's location may be determined relative to map data such as map 250. Through predictive navigation/electronic horizon information, a predicted route 252 may be determined by electronic horizon generator 131. Features of the area, such as buildings 254, 256, 258, and 260 and roads 262, 264, and 266 are illustrated in FIG. 2. Vehicle 129 is located on road 264, with building 258 in the direct line of sight of the passengers.

Figure 3:
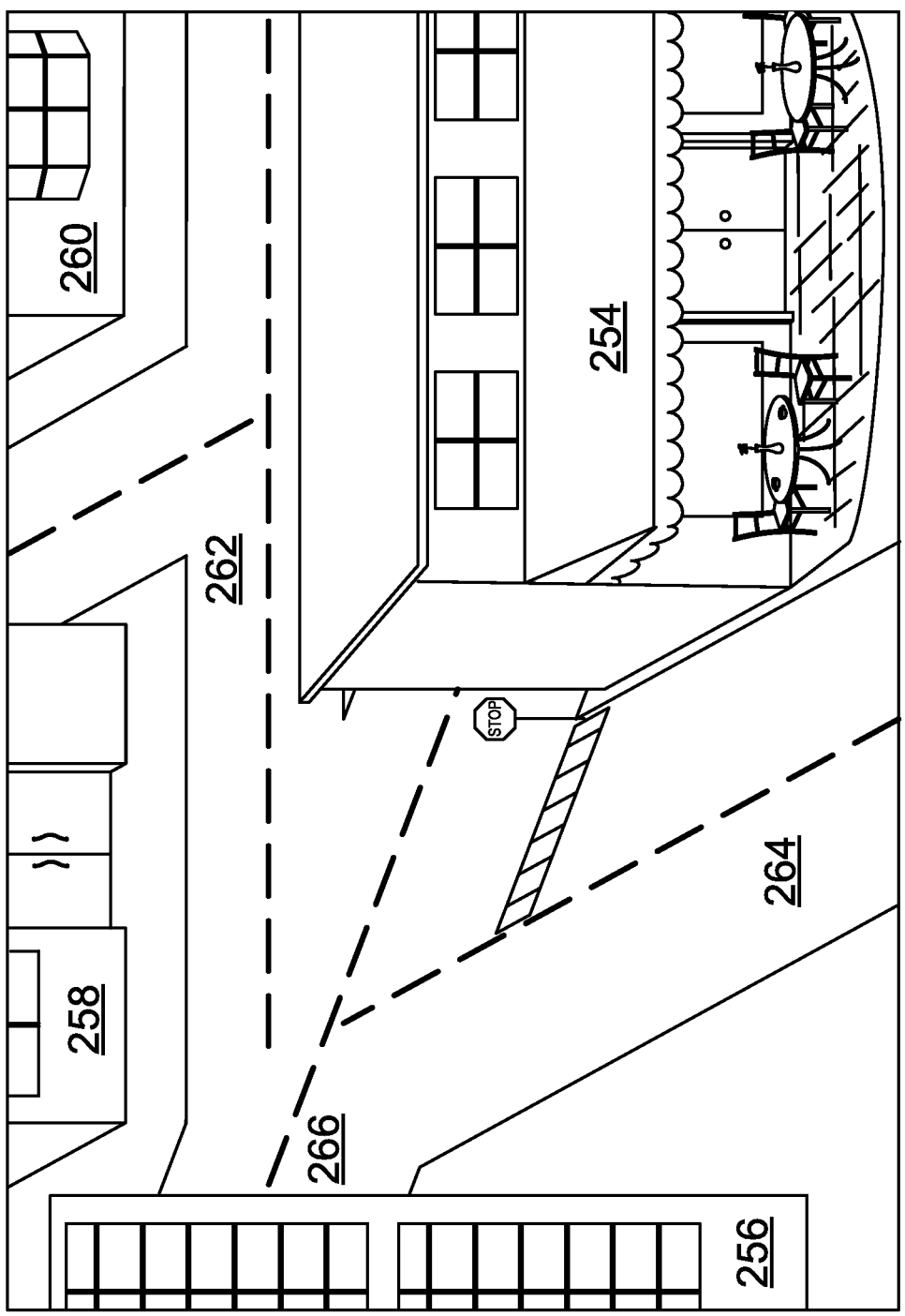
FIG. 3 illustrates the current location of the vehicle and its predicted route from a perspective view in accordance with the subject technology for creating virtual reality elements using predictive vehicle navigation.

FIG. 3 illustrates the current location of the vehicle and its predicted route from a perspective view in accordance with the subject technology for creating virtual reality elements using predictive vehicle navigation. FIG. 3 corresponds to the first person perspective view of the passengers of vehicle 129 as located in FIG. 2. As with first person perspective, movement is represented from this perspective via changes in the background, mid ground, and foreground elements maintaining a similar perspective as the passenger traverses through the environment. None or some of the passenger may be visible within the frame. As a vehicle 129 proceeds, the vehicle may move along the predicted route 252 or depart from the predicted route, the perspective remains constant and the passengers and immediate surroundings may remain illustrated from the first person perspective. Some virtual reality environments may use some or all of the physical environment adding virtual reality elements as layers. For example, a virtual reality environment may be generated based on HD map data stored and electronic horizon generator 131. Street images may be obtained from the databases 123a-n of the electronic horizon generator 131 and combined to form a realistic or semi-realistic image of the vehicle's physical environment. Virtual reality elements may be added, or the virtual reality environment may be skewed to provide a different experience based on the state and/or environment of the vehicle and predictive navigation data acquired by vehicle 129. In one example, the environment may generally correspond with the current physical environment of vehicle 129; however, the perspective of the passenger may be raised in the virtual reality environment such that the virtual environment appears as if the passenger is flying, rather than grounded. In this flying example, speed, incline, decline, acceleration, and deceleration of vehicle 129 may change the perspective height of the virtual flight and speed of the virtual reality environment.

Some or all of the actual, physical view of the passenger may be unobstructed. Virtual reality device 133 may include portions of clear or variable opacity displays that provide the passenger with a partial (or total) view of the physical environment with virtual reality elements projected onto the display. The virtual reality device 133 may not cover the entire field of view of the passenger.

Figure 4A:
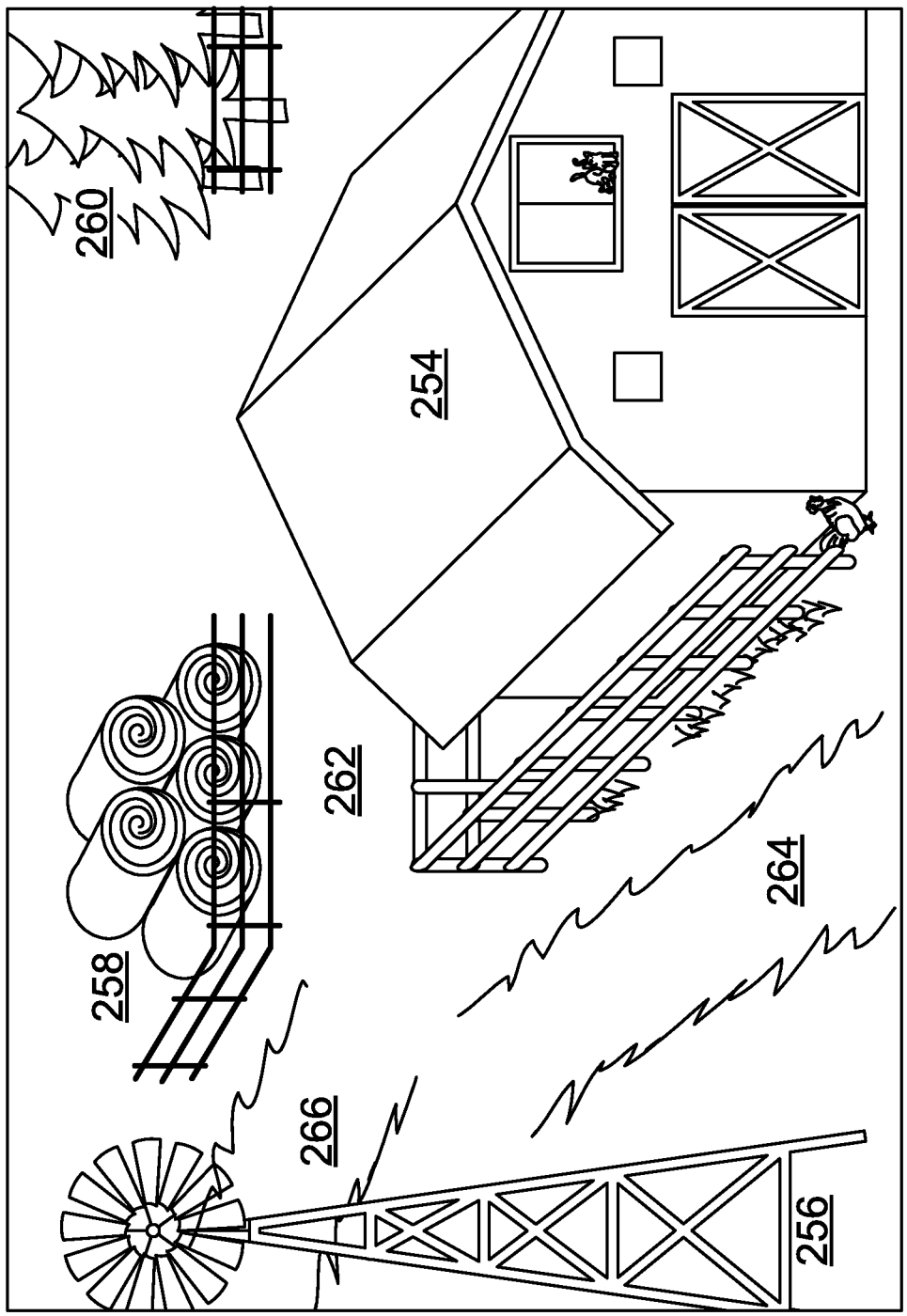
FIG. 4A illustrates an exemplary virtual reality environment based on FIGS. 2 and 3 in accordance with the subject technology for creating virtual reality elements using predictive vehicle navigation.

FIG. 4A illustrates an exemplary virtual reality environment based on FIGS. 2 and 3 in accordance with the subject technology for creating virtual reality elements using predictive vehicle navigation. The illustrated environment is representative of a rural landscape. The rural landscape may correspond to a geographical area that has features approximately corresponding to the features of the current location of vehicle 129. Features such as barn 254, windmill 256, hay bales 258, and trees 260 correspond to the buildings 254, 256, 258, and 260 surrounding the vehicle 129 in the physical world (as illustrated in FIG. 3). Dirt roads 262, 264, and 266 correspond to the roads 262, 264, and 266 immediately surrounding vehicle 129. The virtual reality background may be based on image data associated with a rural landscape with only some corresponding features. For example, LiDAR imagery of a small farm may correspond to dirt roads 262, 264, and 266 and barn 254. As used herein, the term "roughly corresponds" and "generally corresponds" encompass their plain and ordinary meaning including the paths that share a majority of the same turns, straightaways and layout. "Roughly corresponds" and "generally corresponds" may also mean that less than all turns are represented in one path but not in another with correspondence between a majority of the illustrated paths. The width, angle between two connected paths, number of lanes, traffic signals, and other details between paths may differ and still maintain a "rough correspondence" or "general correspondence." These image elements may be combined with generated virtual reality elements for correspondence to the physical environment of the vehicle. That is, the virtual reality environment may include components taken from map imagery stored in electronic horizon generator 131 and combined with generated virtual reality elements in order to correspond with the vehicle's current location. Alternatively, some or all of the virtual reality environment and maybe rendered or stylized based on existing images in map databases and enhanced through virtual reality by virtual reality generator 121.

The presented virtual reality environment may include areas or cities remote from the vehicle's current location. For example, a selection of cities may be provided, with rough correspondence between the current path of the vehicle and the perspective view of the cityscape. For example, as the vehicle turns in physical space, the virtual reality environment may also turn onto the next available or path that roughly corresponds with the path taken by the vehicle in physical space.

Figure 4B:
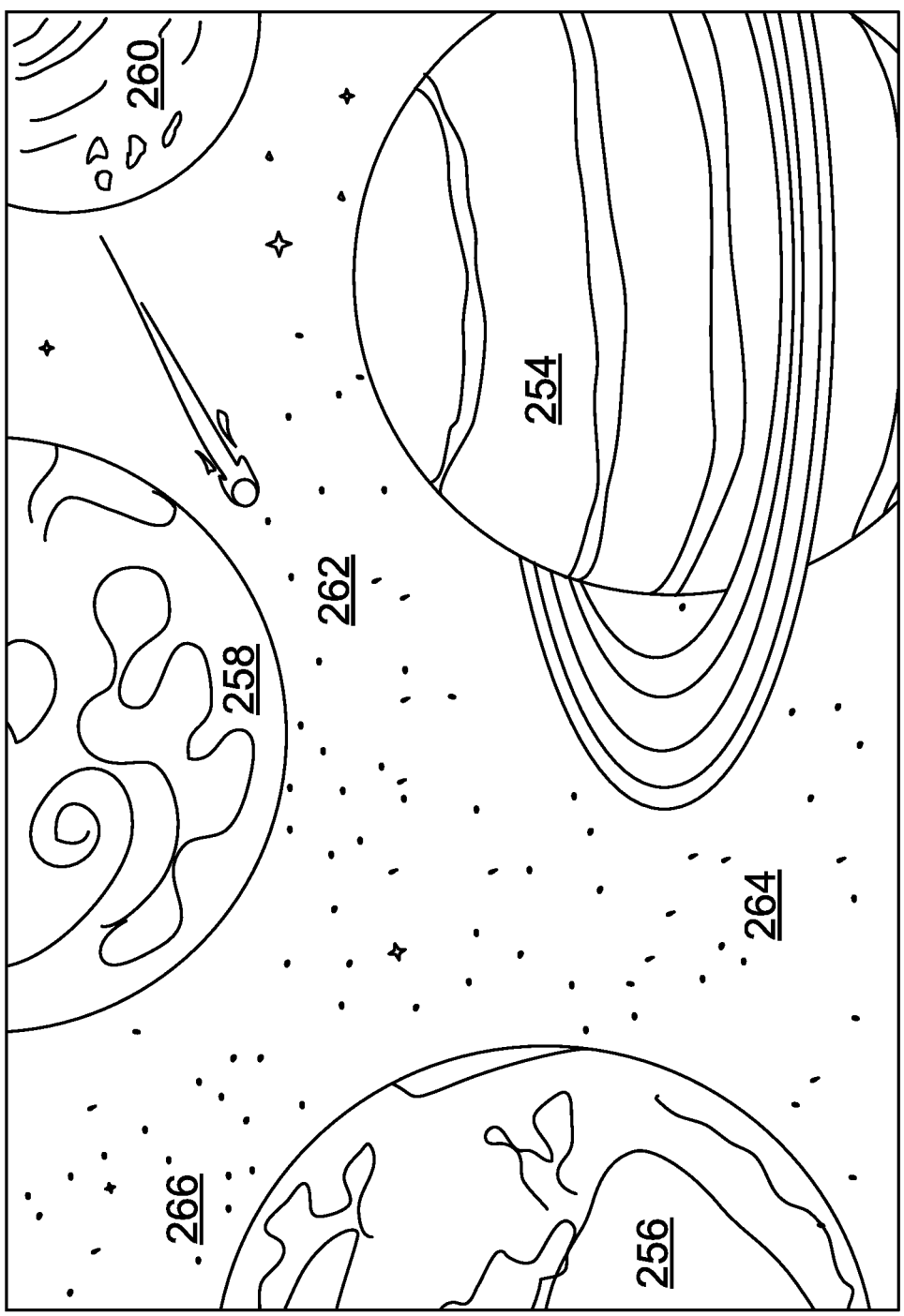
FIG. 4B illustrates another exemplary virtual reality environment based on FIGS. 2 and 3 in accordance with the subject technology for creating virtual reality elements using predictive vehicle navigation.

FIG. 4B illustrates another exemplary virtual reality environment based on FIGS. 2 and 3 in accordance with the subject technology for creating virtual reality elements using predictive vehicle navigation. The illustrated environment depicts a space theme in which planets 254, 256, 258, and 260 correspond to the similarly numbered buildings of FIGS. 2 and 3. The paths between the planets correspond to the generally paths of roads 262, 264, and 266 and are similarly labeled in FIG. 4B. The space environment may be selected by virtual reality generator 121 based on the current speed of the vehicle or based on predictive navigation. For example, if the current state of vehicle 129 is a speed indicating vehicle 129 is on a highway, interstate, or Autobahn (relative high speed travel for vehicle 129), the virtual reality environment may be selected as the space environment because the vehicle is at a relative high speed. When virtual reality generator 121 determines via electronic horizon generator 131 that the vehicle will accelerate from the relative low speed (city driving or traffic jam) to the relative high speed of interstate driving with no traffic, the current scene in the virtual reality environment may change from one environment, such as the rural landscape (which may be used as an environment associated with lower relative speeds of vehicle 129) to the space scene depicted FIG. 4B.

Figure 4C:
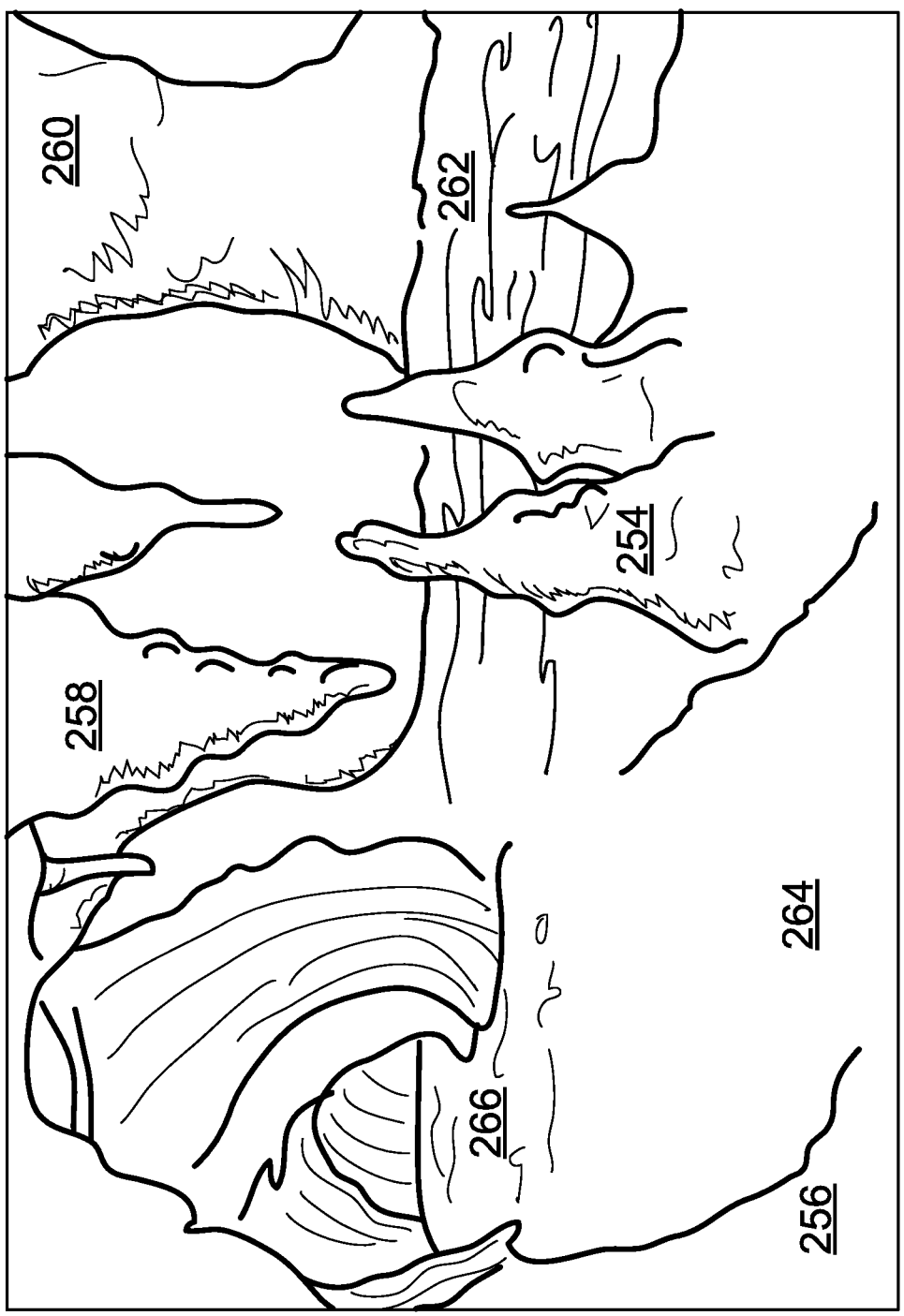
FIG. 4C illustrates another exemplary virtual reality environment based on FIGS. 2 and 3 in accordance with the subject technology for creating virtual reality elements using predictive vehicle navigation.

FIG. 4C illustrates another exemplary virtual reality environment based on FIGS. 2 and 3 in accordance with the subject technology for creating virtual reality elements using predictive vehicle navigation. An underground cave exploration virtual reality environment is illustrated in FIG. 4C. Path 264, tunnel 266, and river 262 of the virtual reality environment may roughly correspond with roads 262, 264, and 266 of FIGS. 2 and 3. The general topography of the physical environment of FIG. 3 is generally repeated in the underground cave exploration environment; however, the structures present in the physical world are replaced with rock formations such as rock walls 256 and 260, stalagmites 254, and stalactites 158. Elements in the virtual reality environment may be generated based on predictive navigation data determined by electric electronic horizon generator 131. For example, the predictive navigation data may anticipate that the vehicle will accelerate from the current vehicle state upon turning on road 262 of predicted route 252. Based on the anticipated change in state the virtual reality environment elements, paths 264 and 262 may be generated accordingly. For example, at relative low speeds, path 264 may appear as a dirt tunnel and relative high speed up travel on path 262 may be rendered as an underground river with strong currents. Predictive navigation data may also include anticipated travel speed data for alternate or available paths for vehicle 129 in addition to the predicted path 252. This predictive alternative path data may be used to generate elements in the virtual reality environment that will be illustrated within the frame even if the passenger and the vehicle 129 continue along the predicted path 252 in the physical world. Virtual reality elements for alternative paths outside of the current field of view of the passenger may be generated and stored by virtual reality generator. If vehicle 129 departs from the predicted path 252, virtual reality environment elements pre-generated and stored alternative path virtual reality may be used. If vehicle 129 departs from the predicted route 252, electronic horizon generator 131 may determine a new predicted route based on the current position of vehicle 129. Electronic horizon generator 131 may continually update predicted route information based on the current location of the vehicle. Virtual reality elements for predicted routes may be generated before the vehicle 129 physically encounters those portions of the path such that the virtual reality environment and/or elements may be generated and transmitted over network 127 from virtual reality generator 121 to mobile device 122, virtual reality device 133, and/or vehicle 129 before the data is needed to render the display for the passenger's experience. Accordingly, a robust virtual reality experience is created because unanticipated losses of network 127 may not affect the virtual reality environment displayed on virtual reality device 133, because one or more of the client devices may be capable of processing and/or rendering and displaying virtual reality elements and environments previously received over network 127. Preprocessing and sending of virtual reality elements and/or environments may prevent gaps in the virtual reality experience due to network connectivity. Because predictive vehicle navigation may identify areas in which network connectivity will be lost well in advance of the vehicle physically approaching an area, the virtual reality environment elements may be regenerated for the length of the anticipated outage and transmitted over network 127 to client devices before the outage will occur, providing a benefit of the disclosure.

Figure 4D:
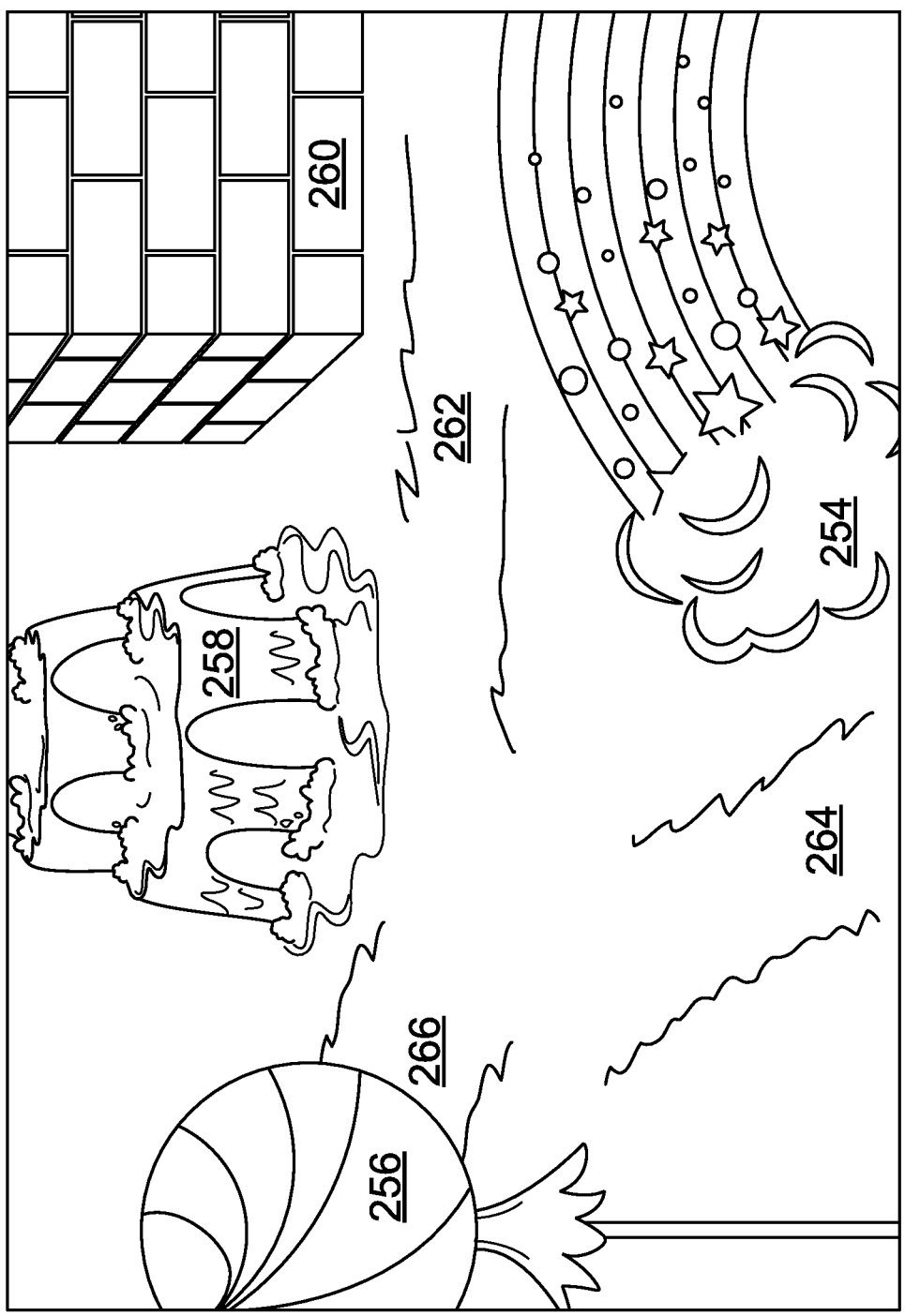
FIG. 4D illustrates another exemplary virtual reality environment based on FIGS. 2 and 3 in accordance with the subject technology for creating virtual reality elements using predictive vehicle navigation.

FIG. 4D illustrates another exemplary virtual reality environment based on FIGS. 2 and 3 in accordance with the subject technology for creating virtual reality elements using predictive vehicle navigation. FIG. 4D is representative of a virtual reality gaming environment that may be generated for interactive virtual reality experiences. The passenger may interact with the virtual reality device 133, mobile device 122, and/or vehicle 129 to provide inputs to the virtual reality game. Game environment elements 254, 256, 258, and 260 generally correspond to the buildings of FIGS. 2 and 3. Similarly, paths 262, 264, and 266 correspond to the paths that are similarly numbered roads of FIGS. 2 and 3. Foreground element rainbow 254, waterfall 258, lollypop 256, and brick wall 260 may change in visual appearance based on detected or anticipated changes in the environment of vehicle 129.

Additional themes may be presented in virtual reality environments of the subject disclosure. The virtual reality experience may enhance the existing view of the physical world by providing historical or tourism information associated with landmarks in the vicinity of the vehicle. Other gaming environments and applications are also contemplated. The virtual environment may be a jungle, waterway, safari, desert, or any other scenario that compliments the sensations of the vehicle. One theme may be used throughout the virtual reality experience, or themes may be selected based on the vehicle's physical trip. For example, the theme may switch from a space theme to a jungle based when the car goes from a relative high speed to a relative low speed.

Figure 5:
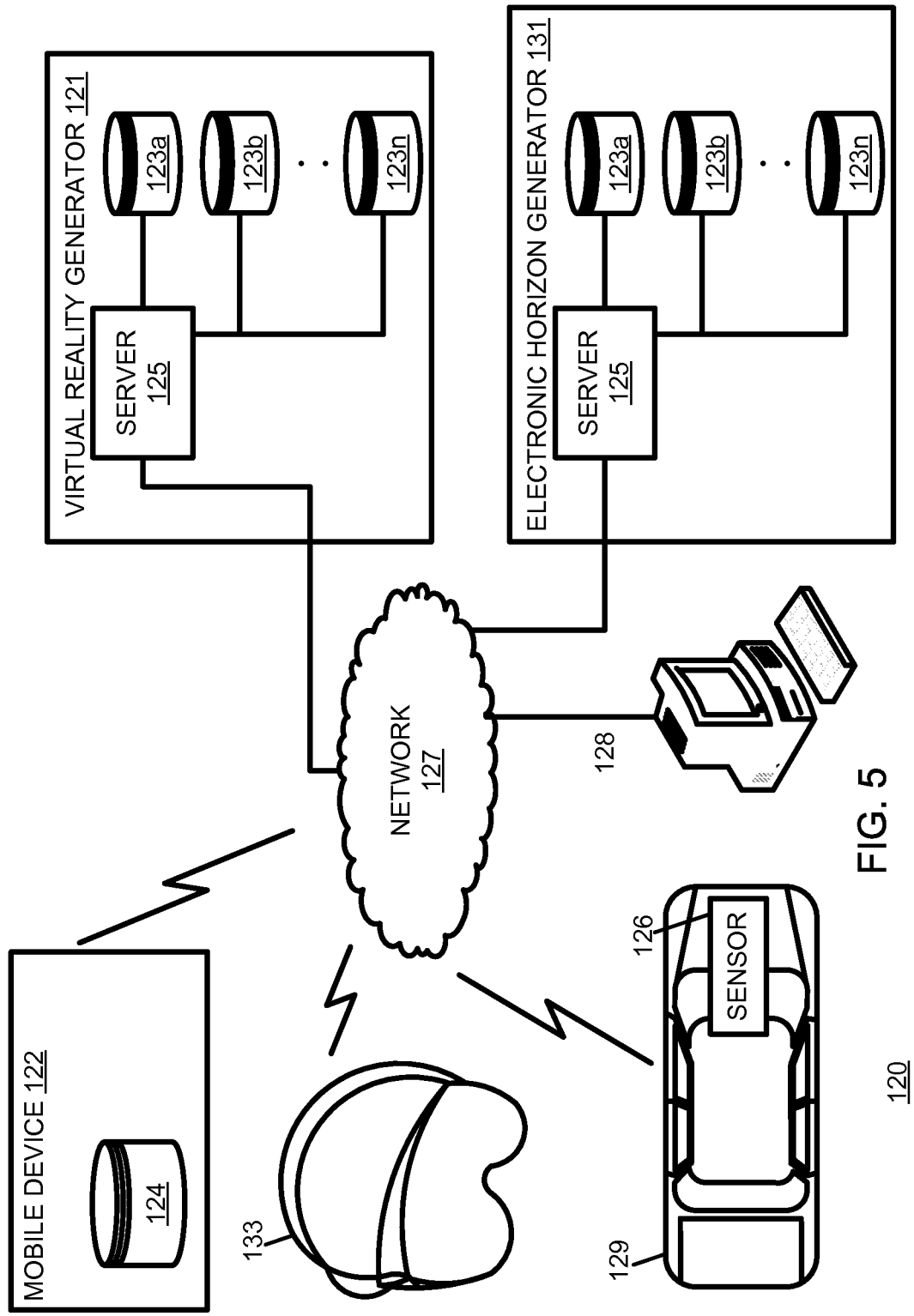
FIG. 5 illustrates an example system of the subject technology for creating virtual reality elements using predictive vehicle navigation.

FIGS. 5-9 illustrates various example systems 120 its components for creating virtual reality elements using predictive vehicle navigation. As illustrated in FIGS. 5-7C, multiple variations of system architectures possible without departing from the scope of the disclosure. In FIG. 5, system 120 may include a virtual reality generator system 121, one or more client devices (such as mobile device 122, vehicle 129, or virtual reality device 133), one or more workstations 128, and a network 127. Additional, different, or fewer components may be provided. For example, many client devices 122, 129, 133 and/or workstations 128 may be connected with the network 127. The virtual reality generator system 121 includes a server 125 and one or more databases. The server 125 may maintain multiple databases 123a, 123b . . . 123n. The term database and refers to a set of data stored in a storage medium and may not necessarily reflect specific any requirements as to the relational organization of the data. The term "server" is used herein to collectively include the computing devices at the virtual reality generator system 121 for creating, maintaining, and updating the multiple databases 123a-n. Any computing device may be substituted for the client device 122, 139, and 133. The computing device may be a host for a website or web service such as a virtual reality service, mapping service, a navigation service, or a predictive vehicle navigation service. A mapping service may provide maps generated from the databases 123a-n using geographic data, and the navigation service may calculate routing or other directions from the geographic data. A predictive mapping service may include or access a mapping service and/or navigation service to provide anticipatory mapping information. A virtual reality service may provide virtual reality elements and/or environments based on information received from client devices, mapping services, navigation services, and/or predictive vehicle navigation services of the databases 123a-n.

Client devices such as mobile device 122, virtual reality device 133, and/or vehicle 129 may include processors and databases providing some or all of the services provided by virtual reality generator 121 and/or electronic horizon generator 131. Local virtual reality generator 121 and/or electronic horizon generator 131 of the client devices may operate in tandem with remote virtual reality generator 121 and/or electronic horizon generator 131 via network 127. As described herein, processing of virtual reality environment and elements as described with reference to virtual reality generator 121 additionally, alternatively, or jointly may be performed by virtual reality generators disposed in or integral with mobile device 122, virtual reality device 133, and/or vehicle 129.

Passengers may further provide information such as navigation information, destination, start, length of trip or other information via client devices. This information may be used by electronic horizon generator 131 and/or virtual reality generator 121 to reduce processing needs. Trips with user entered route information, such as a destination, may result in reduced computational requirements on electronic horizon generator 131 and virtual reality generator 121, because elements of the trip are known and the necessary predictive navigation data may be reduced. The virtual reality generator 121 and electronic horizon generator 131 may further employ adaptive learning techniques to determine frequently repeated routes, destinations, and tendencies associated with drivers and other passengers. One example of a repeated route is a commute to the driver's workplace. The virtual reality generator 121 and/or electronic horizon generator 131 may identify this repeated route and store or pre-compute elements of the virtual reality environment in association with the route and/or time of travel. Repeated routes or portions of repeated routes may be stored locally on client devices, requiring reduced or no interaction with virtual reality generator 121 and/or electronic horizon generator 131 via network 127. If vehicle 129 begins a repeated route and departs from the repeated route, new virtual reality information may be generated based on the changing route. A repeated route or a virtual reality experienced that is favored by the passenger may be identified by the passenger or automatically identified via the virtual reality generator 121 and may be stored on databases of the mobile device 122, virtual reality device 133, or vehicle 129 for ease of access.

The use of the electronic horizon generator 131 and virtual reality generator 121 over network 127 may provide the ability to identify location and conditions of the vehicle and vehicle's surrounding within a range of several kilometers/miles from the current location of vehicle 129. Based on this advance knowledge of possible vehicle information, the virtual reality environment may be generated and cached in a client device 122, 133, or 129, avoiding connectivity issues with network 127, and providing additional processing time to create more elaborate or detailed environments reflective of the location of vehicle 129 by anticipating the vehicle's future movements and location in advance. Hybrid experiences may be provided where portions of the virtual reality environment are computed and cached and other information is generated as it becomes available, either locally by a client device or remotely by virtual reality generator 121 and electronic horizon generator 131 via network 127.

Figure 9:
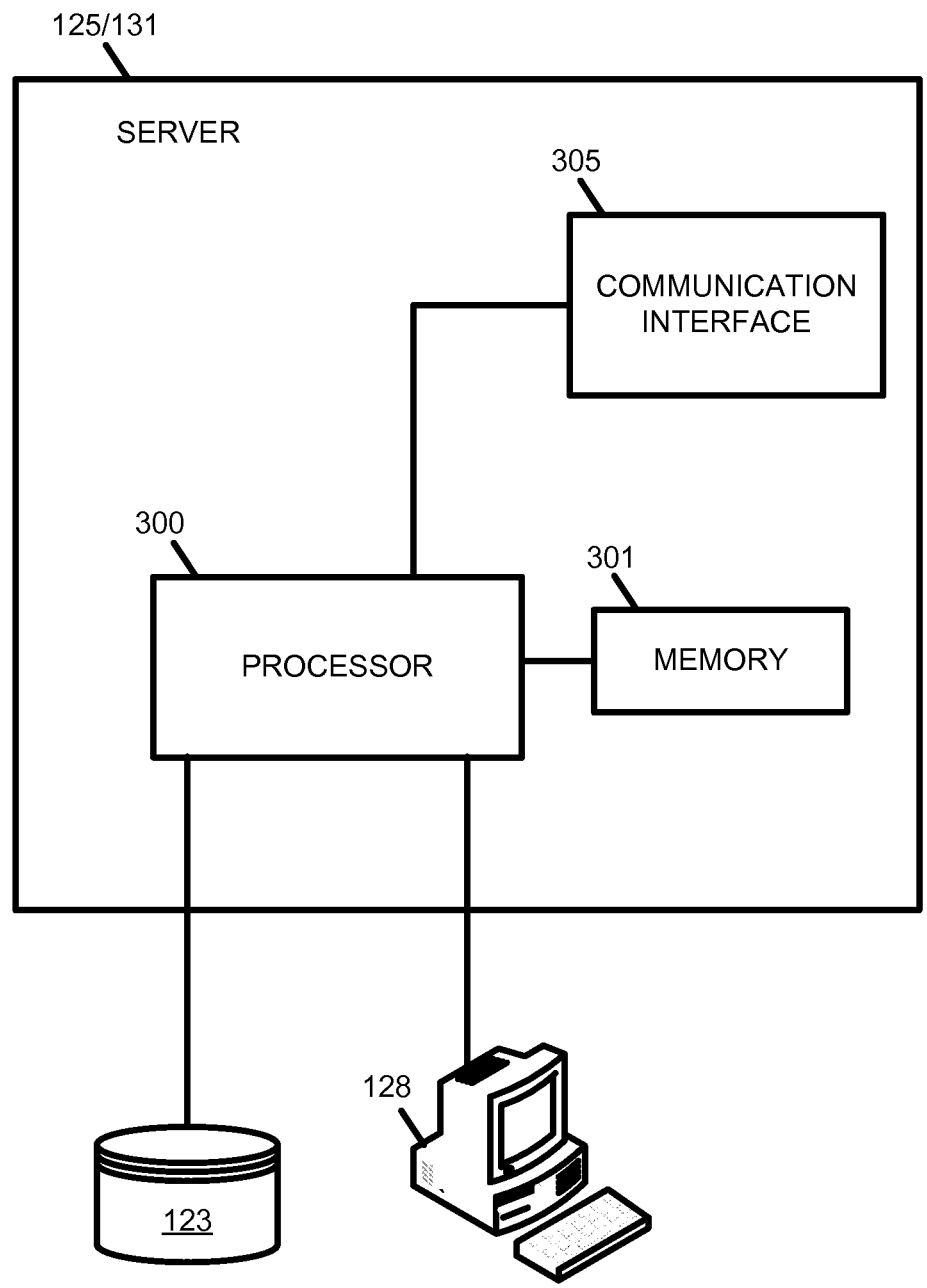
FIG. 9 illustrates an example server of the subject technology for creating virtual reality elements using predictive vehicle navigation.

The databases 123a-n may include a virtual reality imagery database including multiple virtual environments and virtual elements. The databases 123a-n may include map databases, predictive navigation databases, a road imagery database including street level images, point cloud data, and/or existing map data. As shown in FIG. 9, a master copy of part or all of database 123 may be stored at the virtual reality generator system 121 and/or electronic horizon generator 131. The databases 123b-n may include alternative versions or past versions of virtual reality elements and/or environments using sensor information from vehicle 129 and/or predictive vehicle navigation information associated with navigation maps. The master copy of the database 123 may be the most current or up to date copy of the database. In addition, the client devices such as mobile device 122, vehicle 129, or virtual reality device 133 may store a local copy of the database 123. In one example, the local copy of the database 123 is a full copy of the database, and in another example, the local copy of the database 123 may be a cached or partial portion of one or more of databases 123a-n.

The local copy of the database 123 may include data from various versions of the database 123a-n. The cached portion may be defined based on a geographic location of mobile devices 122, vehicles 129, or virtual reality devices 133 or a user selection made at the client devices 122, 129, or 133. The servers 125 may send virtual reality data and/or predictive navigation data to the client devices 122, 129, or 133.

The mobile device 122 may be a personal navigation device (PND), a portable navigation device, smart phone, a mobile phone, a personal digital assistant (PDA), a car, a tablet computer, a notebook computer, and/or any other known or later developed connected device or personal computer. Non-limiting embodiments of navigation devices may also include relational database service devices, mobile phone devices, or car navigation devices. Mobile device 122 may be coupled with or mounted on virtual reality device 133, such that a display of the mobile device 122 constitutes the display of virtual reality device 133. Mobile device 122 may include one or more database 124. The content of database 124 may include some or all portions of data stored in databases 123a-n.

Vehicle 129 may be coupled with a client device or may include one or more mobile devices 122, one or more virtual reality devices 133, and one or more sensors 126. Vehicle 129 may have a mobile device 122 and/or virtual reality device 133 associated with one or more passengers. Vehicle 129 may be an autonomous driving vehicle, a data acquisition vehicle, or a vehicle equipped with navigation or other communication capabilities. Sensors 126 may include short range sensors capable of collecting data at a range of up to a few hundred meters/feet. Non limiting examples of short range sensors include both active and passive detectors including, but not limited to, infrared detectors, ultrasonic detectors, microwave detectors, acoustic detectors, piezoelectric, photoelectric, wideband spread-spectrum, inductive loop, position, velocity, acceleration detectors. Some sensors may acquire information about the current state of the vehicle including engine pressure, temperature, tire pressure, wheel speed and vibration. Some sensors 126 may detect data used by the predictive navigation system including but not limited to, battery charge level, gas level, turn signal setting, steer angle, gear selection, windshield wiper setting, headlight and interior light settings, obstacle detection, and a navigation system. Some sensor data may be acquired by other vehicles on the roadway used to determine anticipated road conditions for vehicles behind it.

The virtual reality device 133 may include virtual reality headsets, helmets, glasses, screens, controllers, remotes, or joysticks. Virtual reality device may further include one or more processor, memory, input device, communication interface, position circuitry and/or display. The virtual reality device 133 may be integrated with or coupled with a mobile device 122.

The virtual reality generator system 121, electronic horizon generator system 131, the workstation 128, mobile device 122, vehicle 129, virtual reality device 133, networking device 135 and traffic device 137 are coupled with the network 127. The phrase "coupled with" is defined to mean directly connected to or indirectly connected through one or more intermediate components. Such intermediate components may include hardware and/or software-based components.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 6:
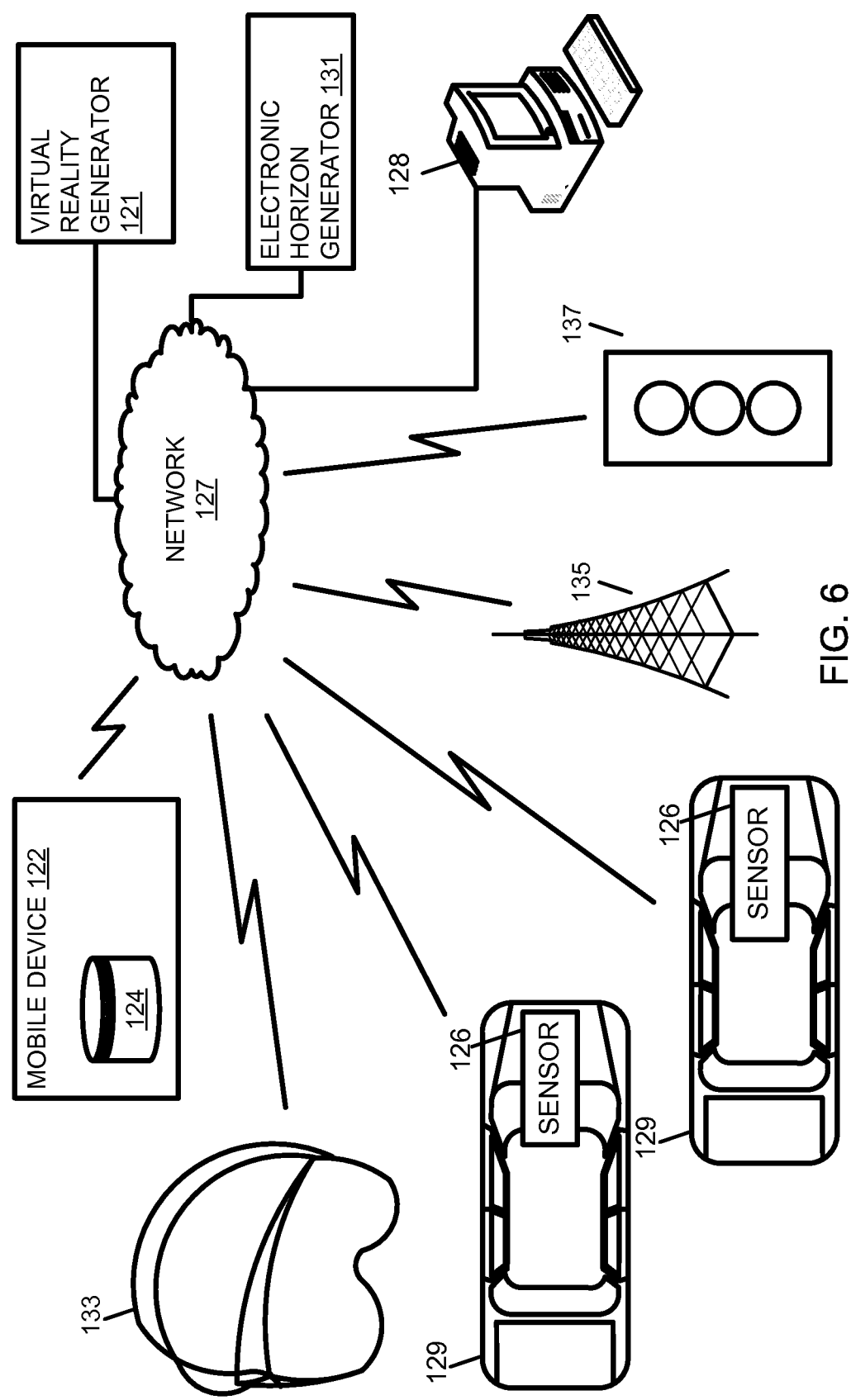
FIG. 6 illustrates an example system of the subject technology for creating virtual reality elements using predictive vehicle navigation.

As illustrated in FIG. 6, the system 120 of FIG. 5 may include additional devices and components communicating with the network and/or virtual reality generator 121 and/or electronic horizon generator 131. These additional devices and components may include additional vehicles 129, networking device 135, and traffic device 137. Vehicles 129 may provide information to virtual reality generator 121 and electronic horizon generator 131 that may be used to generate virtual reality content for passengers in other vehicles 129.

Networking devices 135 may include base transceiver stations (BTS) routers, switches, access devices, multiplexers, and servers. Networking devices 135, such as a BTS may store data collected by passing vehicles via Edge computing. Vehicle data stored by networking devices 135 may later be accessed or received via network 127 to generate virtual reality content for later passing vehicles. Traffic device 137 include data sources providing data associated with traffic signals and patterns including traffic lights, pedestrian crosswalk lights, railroad crossing arms, traffic cameras, radar sensors, traffic signal preemption devices, or any other traffic or transportation related device. Traffic device 137 may provide data associated with roadway infrastructure. Data stored locally on networking devices 135 may include pre-defined or pre-computed models for the virtual reality system to reduce latency in the system. Topography, local traffic conditions, infrastructure information, or other data may be stored in a networking device 135 such as a base station. The storage and preparation of such data may provide flexibility for the system, eliminating the need for some information to be passed through portions of network 127 to virtual reality generator 121 or electronic horizon generator 131. Locally stored information may be received directly by the client devices 122, 129, and/or 133 and processed locally on one or more of these devices to produce or enhance virtual reality elements and environments of the system.

Vehicle 129 may communicate with one or more additional vehicles 129 near the current location of vehicle 129. Alternatively or additionally, data originating from additional vehicles 129 received or acquired by virtual reality generator 121 and/or electronic horizon generator 131 over network 127 and may be used to generate predictive navigation.

Figure 7A:
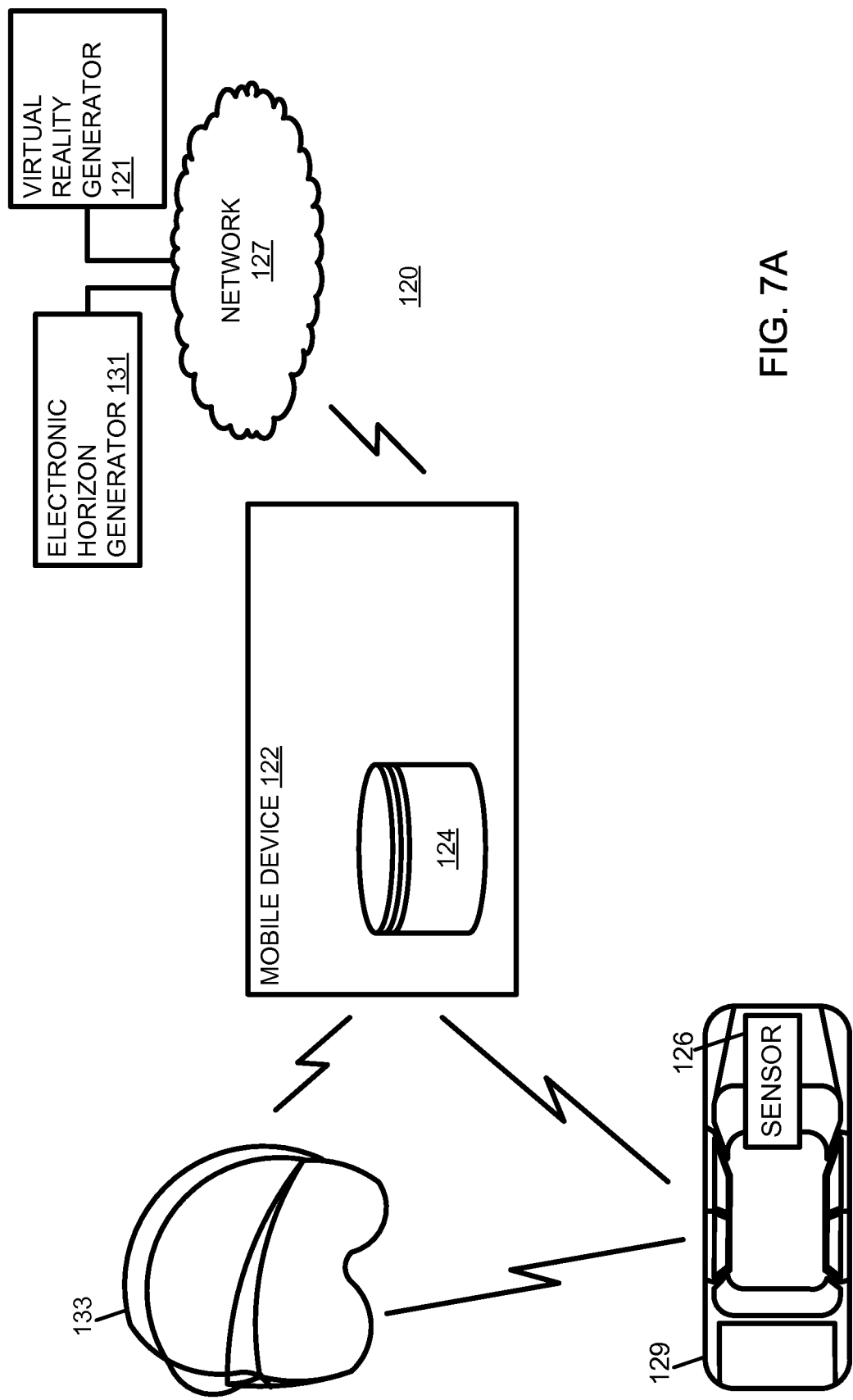
FIG. 7A illustrates an example system of the subject technology for creating virtual reality elements using predictive vehicle navigation.

FIG. 7A illustrates an embodiment of system 120 in which mobile device 133 serves as the primary connection to virtual reality generator 121 and electronic horizon generator 131. The virtual reality device 133 and vehicle 129 may transmit and receive data to mobile device 122. Mobile device 122 may receive virtual reality data from virtual reality generator 121 and/or electronic horizon generator 131 and transmit the received data to virtual reality device 133 and/or vehicle 129. Mobile device 122 may receive or access data from sensor 126 and, in turn, transmit the received sensor data to the electronic horizon generator 131 and/or virtual reality generator 121 via network 127.

Figure 7B:
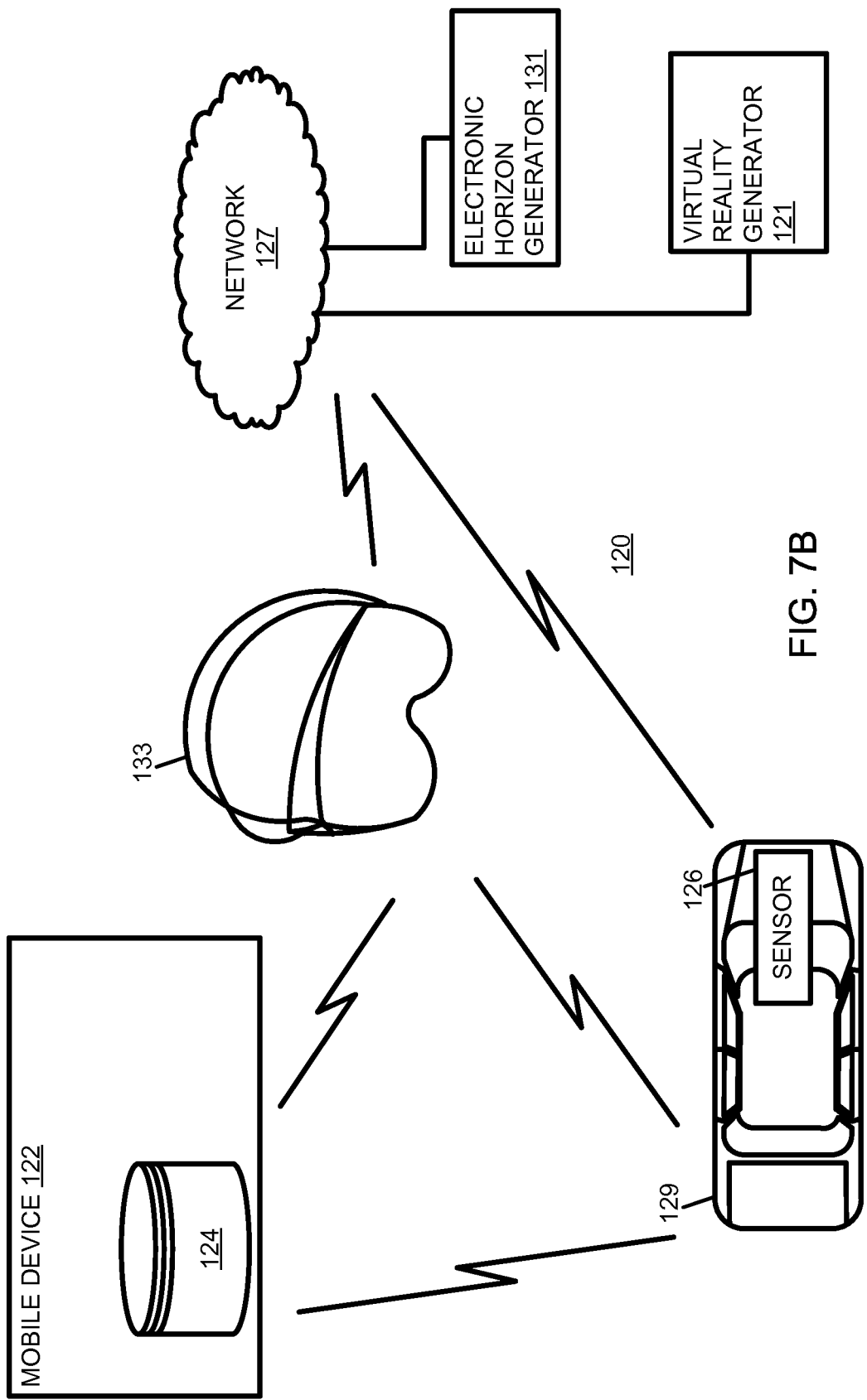
FIG. 7B illustrates an example system of the subject technology for creating virtual reality elements using predictive vehicle navigation.

In some embodiments of system 120 as illustrated in FIG. 7B, the virtual reality device 133 may be connected to the electronic horizon generator 131 and the virtual reality generator 121 via network 127. The virtual reality device 133 may be connected both the vehicle 129 and a mobile device 122 via a wired or wireless personal area network (PAN) such as Bluetooth or Universal Serial Bus (USB), Wi-Fi, sim card, cellular network, or other wired or short range connection. The virtual reality device 133 may receive or retrieve sensor related information directly from vehicle 129, or may receive or retrieve sensor related information associated with vehicle 129 via network 127. Virtual reality device 133, mobile device 122, and vehicle 129 may be connected to other virtual reality devices 133 and/or mobile devices 122 of passengers in the same vehicle 129. Client devices 122, 133, and 129 may further connect with client devices associated with other vehicles proximate to vehicle 129.

Figure 7C:
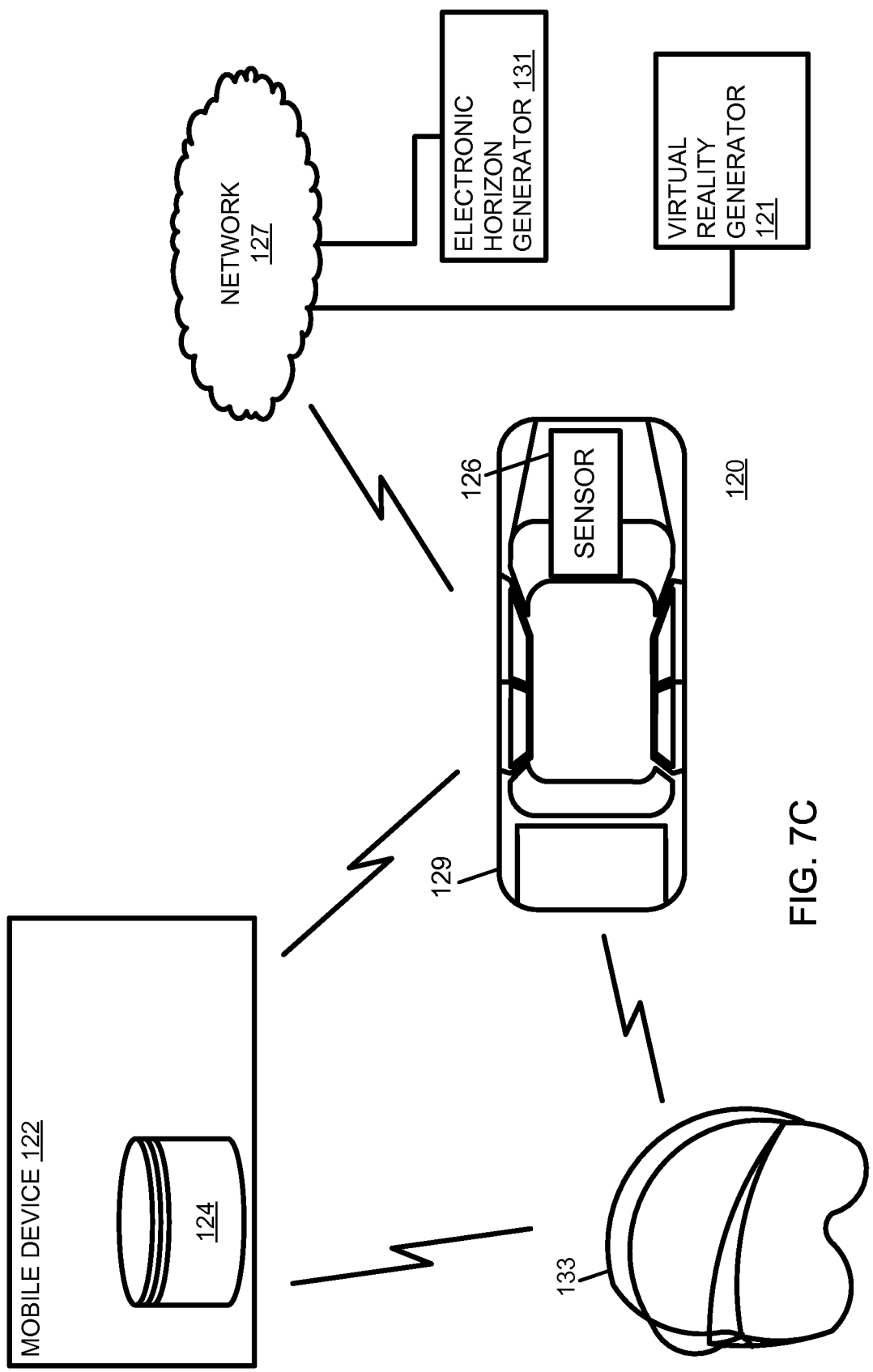
FIG. 7C illustrates an example system of the subject technology for creating virtual reality elements using predictive vehicle navigation.

As illustrated in FIG. 7C, system 120, vehicle 129 may be connected to the electronic horizon generator 131 and virtual reality generator 121 via network 127. Mobile device 122 and virtual reality device 133 may be connected to vehicle 129. In some cases and/or during some periods of time, mobile device 122 and/or virtual reality device 133 may not be directly connected to network 127 and may send and receive information associated with virtual electronic horizon generator 131 and virtual reality generator 121 only through vehicle 129. Unlike FIG. 7B, virtual reality device 133 may not directly access network 127, electronic horizon generator 131, or virtual reality generator 121. Instead, vehicle 129 may provide virtual reality content to virtual reality device 133.

Figure 8:
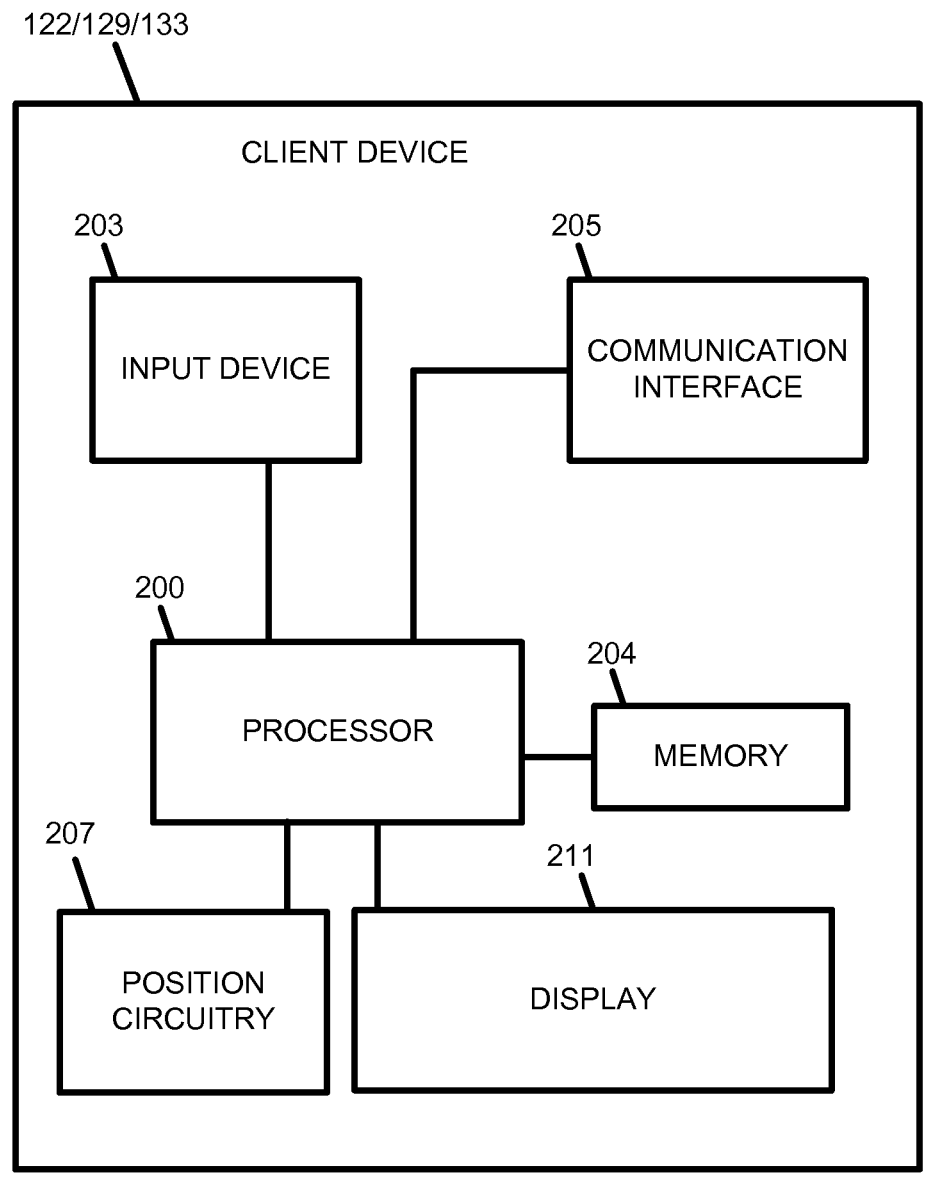
FIG. 8 illustrates an example client device of the subject technology for creating virtual reality elements using predictive vehicle navigation.

FIG. 8 illustrates an exemplary client device such as mobile device 122, vehicle 129, and virtual reality device 133 of the system of the preceding figures. The client devices 122, 129, and/or 133 include a processor 200, a memory 204, an input device 203, a communication interface 205, position circuitry 207, and a display 211. Additional, different, or fewer components are possible for the client devices 122, 129, and/or 133.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of client devices 122, 129, and/or 133. The positioning system may also include a receiver and correlation chip to obtain a GPS signal. Alternatively or additionally, the one or more detectors or sensors may include an accelerometer built or embedded into or within the interior of the client devices 122, 129, and/or 133. The accelerometer is operable to detect, recognize, or measure the rate of change of translational and/or rotational movement of the client devices 122, 129, and/or 133. client devices 122, 129, and/or 133 receive location data from the positioning system. The location data indicates the location of client devices 122, 129, and/or 133.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from client devices 122, 129, and/or 133, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Client devices 122, 129, and/or 133 are configured to execute algorithms to for generating, enhancing, rendering, and/or displaying virtual reality elements and/or virtual reality environments. Virtual reality elements may be dependent on information acquired by sensors of vehicle 129, using predictive vehicle navigation associated with mapping databases, and may also be dependent on information originating from other sources such as networking devices 135, traffic signals 137, emergency services and the like. Client devices 122, 129, and/or 133 may be configured to acquire sensor information from one or more vehicles 129 including geolocation, short range sensors of vehicles 129, and/or navigation information and/or predictive vehicle navigation information from electronic horizon generator 131. Using acquired information, the client devices 122, 129, and/or 133 independent of, or in conjunction with, servers 125 generate, enhance, render, and/or display virtual reality elements and/or virtual reality environments.

Using input from the end user, client devices 122, 129 and/or 133, the client devices and/or electronic horizon generator 131 may examine potential routes between an origin location and a destination location to determine an optimum route. Client devices 122, 129 and/or 133, the client devices and/or electronic horizon generator 131 may then provide the end user with information about the optimum route in the form of guidance that identifies the maneuvers required to be taken by the end user to travel from the origin to the destination location. Some client devices 122, 129 and/or 133, may additionally display detailed maps on displays outlining the route, the types of maneuvers to be taken at various locations along the route, locations of certain types of features, and so on.

FIG. 9 illustrates example servers such as the servers 125 of virtual reality generator 121 and/or electronic horizon generator 131. The server 125 includes a processor 300, a communication interface 305, and a memory 301. The server 125 may be coupled to one or more databases 123 and a workstation 128. The workstation 128 may be used to enter data regarding sensor information, images, map data, virtual reality elements, virtual reality environments, navigation information, and predictive navigation information. The databases 123 may include information entered from workstation 128, sensor information, images, map data, virtual reality elements, virtual reality environments, navigation information, and predictive navigation information. Additional, different, or fewer components may be provided in the server 125. FIG. 1 illustrates an example flow diagram for the operation of server 125. Additional, different, or fewer acts may be provided.

The processor 300 and/or processor 200 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 301 and/or memory 204 may be a volatile memory or a non-volatile memory. The memory 301 and/or memory 204 may include one or more of a read only memory (ROM), random access memory (RAM), a flash memory, an electronic erasable program read only memory (EEPROM), or other type of memory. The memory 301 and/or memory 204 may be removable from client devices 122, 129, and/or 133, such as a secure digital (SD) memory card.

The communication interface 305 and/or communication interface 205 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays, and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method of generating a virtual reality environment for a wearable virtual reality device for a passenger of a vehicle, the method comprising: receiving a vehicle state sensor data record associated with a current state of the vehicle;
   receiving, from map data associated with a current location of the vehicle, a predictive vehicle navigation data record including an electronic horizon of the vehicle including a relative speed of the vehicle relative to an environment or relative to another vehicle;
   adapting a first element of the virtual reality environment for the wearable virtual reality device based on the received vehicle state sensor data record;
   generating a second element of the virtual reality environment for the wearable virtual reality device based on the received predictive vehicle navigation data record and the electronic horizon of the vehicle including the relative speed of the vehicle for an increase or decrease of speed of the vehicle within the virtual reality environment;
   combining the first element of the virtual reality environment based on the received vehicle state sensor data record and the second element of the virtual reality environment based on the received predictive vehicle navigation data record and the electronic horizon of the vehicle including the relative speed of the vehicle; and
   providing, to the wearable virtual reality device, the first element of the virtual reality environment based on the received vehicle state sensor data record and the second element of the virtual reality environment based on the received predictive vehicle navigation data record and the electronic horizon of the vehicle including the relative speed of the vehicle.

2. The method of claim 1, the method further comprising:
receiving a vehicle environment sensor data record associated with current surroundings of the vehicle; and
generating a third element of the virtual reality environment based on the received vehicle environment sensor data record associated with the current surroundings of the vehicle.

3. The method of claim 1, the method further comprising:
sending an instruction to adjust an instrument of the vehicle based on the virtual reality environment.

4. The method of claim 1, the method further comprising:
receiving an externally generated vehicle state sensor data record from at least one other vehicle; and
adapting a fourth element of the virtual reality environment based on the received externally generated vehicle sensor data record.

5. The method of claim 1, the method further comprising:
receiving an infrastructure data record from roadway infrastructure; and
adapting a fifth element of the virtual reality environment based on the received infrastructure data record.

6. The method of claim 1, wherein the received vehicle state sensor data record includes a current state of acceleration or deceleration of the vehicle.

7. The method of claim 1, wherein the virtual reality environment includes a path corresponding to a predicted route of the vehicle.

8. An apparatus for generating a virtual reality environment for a wearable virtual reality device for a passenger of a vehicle, comprising:
at least one processor; and
at least one memory including computer program code for one or more programs; the at least one memory and the computer program code configured to, with the at least one processor, cause the system to at least perform:
receive a vehicle state sensor data record associated with a current state of the vehicle;
receive a predictive vehicle navigation data record including an electronic horizon of the vehicle including a relative speed of the vehicle relative to an environment or relative to another vehicle;
receive a vehicle environment sensor data record associated with current surroundings of the vehicle;
adapt a first element of a virtual reality environment for the wearable virtual reality device based on the received vehicle state sensor data records;
generate a second element of the virtual reality environment for the wearable virtual reality device based on the received predictive vehicle navigation data record, the second element providing an increase or decrease of speed of the vehicle within the virtual reality environment; and
generate a third element of the virtual reality environment for the wearable virtual reality device based on the received vehicle environment sensor data record associated with the current surroundings of the vehicle; and
combine the first element of the virtual reality environment, the second element of the virtual reality environment, and the third element of the virtual reality environment for the wearable virtual reality device.

9. The system of claim 8, the at least one memory and the computer program code configured to, with the at least one processor, cause the system to at least perform:
send an instruction to adjust an instrument of the vehicle based on the virtual reality environment.

10. The system of claim 8, the at least one memory and the computer program code configured to, with the at least one processor, cause the system to at least perform:
receive an externally generated vehicle state sensor data record from at least one other vehicle; and
adapt a fourth element of the virtual reality environment based on the received externally generated vehicle sensor data record.

11. The system of claim 8, the at least one memory and the computer program code configured to, with the at least one processor, cause the system to at least perform:
receive an infrastructure data record from roadway infrastructure; and
adapt a fifth element of the virtual reality environment based on the received infrastructure data record.

12. The system of claim 8, wherein the received vehicle state sensor data record includes a current state of acceleration or deceleration of the vehicle.

13. The system of claim 8, wherein the virtual reality environment includes a path corresponding to a predicted route of the vehicle.

14. A non-transitory computer readable medium including instructions that when executed are operable to:
receive a vehicle state sensor data record associated with a current state of a vehicle;
receive a predictive vehicle navigation data record including electronic horizon of the vehicle including a relative speed of the vehicle relative to an environment or relative to another vehicle;
receive a vehicle environment sensor data record associated with current surroundings of the vehicle; and
provide a display for a wearable virtual reality device with the current state of the vehicle, the predictive vehicle navigation record including the electronic horizon of the vehicle and the current surroundings of the vehicle to provide an increase or decrease of speed of the vehicle within the virtual reality environment.

15. The non-transitory computer readable medium of claim 14, including instructions that when executed are operable to:
send an instruction to adjust an instrument of the vehicle based on the virtual reality environment.

16. The non-transitory computer readable medium of claim 14, including instructions that when executed are operable to:
receive an externally generated vehicle sensor data record from at least one other vehicle; and
adapt a fourth element of the virtual reality environment based on the received externally generated vehicle sensor data record.

17. The non-transitory computer readable medium of claim 14, including instructions that when executed are operable to:
receive an infrastructure data record from roadway infrastructure; and
adapt a fifth element of the virtual reality environment based on the received infrastructure data record.

18. The non-transitory computer readable medium of claim 14, wherein the received vehicle state sensor data record includes a current state of acceleration or deceleration of the vehicle.

19. The non-transitory computer readable medium of claim 14, wherein the generated the virtual reality environment includes a path corresponding to a predicted route of the vehicle.

20. The non-transitory computer readable medium of claim 14, including instructions that when executed are operable to:
- receive an autonomous driving vehicle data record associated with driver control: and
- generate a sixth element of the virtual reality environment based on the received autonomous driving vehicle data record.

* * * * *